US012777381B2

(12) United States Patent
Pezeshki et al.

(10) Patent No.: US 12,777,381 B2
(45) Date of Patent: Oct. 27, 2026

(54) TECHNIQUES FOR NON-SERVING CELL REPORTING IN WIRELESS COMMUNICATIONS SYSTEMS

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/536,788

(22) Filed: Nov. 29, 2021

(65) Prior Publication Data

US 2022/0225188 A1 Jul. 14, 2022

Related U.S. Application Data

(60) Provisional application No. 63/137,635, filed on Jan. 14, 2021.

(51) Int. Cl.

*H04W 36/00* (2009.01)
*H04W 72/21* (2023.01)
*H04W 36/30* (2009.01)

(52) U.S. Cl.

CPC ... *H04W 36/0085* (2018.08); *H04W 36/0061* (2013.01); *H04W 72/21* (2023.01); *H04W 36/302* (2023.05)

(58) Field of Classification Search

CPC ......... H04W 36/0085; H04W 36/0061; H04W 36/00835; H04W 36/30; H04W 36/0058; H04W 72/21; H04W 36/302

(Continued)

(56) References Cited

U.S. PATENT DOCUMENTS

2015/0264592 A1* 9/2015 Novlan ............... H04L 27/2601 370/252
2016/0242058 A1* 8/2016 Kazmi .................. H04W 72/23

(Continued)

FOREIGN PATENT DOCUMENTS

WO WO-2020092468 A1 5/2020
WO WO-2020252339 A1 * 12/2020 ........... H04B 17/309

OTHER PUBLICATIONS

Ericsson: "Lower-Layer Mobility Enhancements", 3GPP Draft, 3GPP TSG-RAN WG1 Meeting #99, Tdoc R1-1912060, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-11, Nov. 8, 2019 (Nov. 8, 2019), XP051819934, Retrieved from the Internet: URL: https://ftp.3gpp.org/tsg_ran/WG1_RL1/TSGR1_99/Docs/R1-1912060.zip R1-1912060 Lower-layer mobility enhancements.docx [retrieved on Nov. 8, 2019] Abstract p. 3, Observation 3, Sections 2, 2.1, 2.2, pp. 1-10.

(Continued)

*Primary Examiner* — Ricardo H Castaneyra
(74) *Attorney, Agent, or Firm* — QUALCOMM Incorporated

(57) ABSTRACT

Methods, systems, and devices for wireless communication are described. A user equipment (UE) may receive control signaling from a base station indicating a configuration for layer one (L1) measuring and reporting of downlink reference signals received from a non-serving cell. The UE may receive a set of downlink signals (e.g., a set of synchronization signal blocks (SSBs) or a set of channel state information reference signals (CSI-RSs)) from a base station associated with the non-serving cell. In response to receiving the downlink reference signals, the UE may determine channel information including of a set of channel metrics based on measuring the downlink reference signals. The UE (Continued)

may then transmit an L1 report to the base station of the serving cell indicating the channel information.

19 Claims, 14 Drawing Sheets

(58) Field of Classification Search
USPC .......................................... 370/329, 252, 331
See application file for complete search history.

(56) References Cited

U.S. PATENT DOCUMENTS

| | | | | |
|---|---|---|---|---|
| 2018/0007577 | A1* | 1/2018 | Guo | H04W 24/10 |
| 2018/0317278 | A1* | 11/2018 | Fujishiro | H04W 36/0088 |
| 2019/0222286 | A1 | 7/2019 | Miao | |
| 2019/0268061 | A1 | 8/2019 | Li et al. | |
| 2019/0306924 | A1* | 10/2019 | Zhang | H04B 7/063 |
| 2020/0305038 | A1* | 9/2020 | Tooher | H04W 74/0833 |
| 2021/0029650 | A1* | 1/2021 | Cirik | H04W 52/146 |
| 2021/0195476 | A1 | 6/2021 | Zhang et al. | |
| 2022/0095127 | A1* | 3/2022 | Tang | H04L 5/0098 |
| 2022/0377622 | A1* | 11/2022 | Zhang | H04W 72/21 |
| 2023/0098488 | A1* | 3/2023 | Li | H04B 7/088 370/331 |
| 2023/0189046 | A1* | 6/2023 | Liu | H04W 72/566 370/329 |

OTHER PUBLICATIONS

Ericsson: "Measurement Framework for LAA", 3GPP Draft, 3GPP TSG-RAN WG2 #89bis, Tdoc R2-151499—Measurement Framework for LAA, 3rd Generation Partnership Project (3GPP), Mobile Competence Centre, 650, Route Des Lucioles, F-06921 Sophia-Antipolis Cedex, France, vol. RAN WG2, No. Bratislava, Slovakia, Apr. 20, 2015-Apr. 24, 2015 Apr. 19, 2015 (Apr. 19, 2015), XP050936422, pp. 1-2, Retrieved from the Internet: URL: http://www.3gpp.org/ftp/Meetings_3GPP_SYNC/RAN2/Docs/ [retrieved on Apr. 19, 2015] Paragraph [02.1].

International Search Report and Written Opinion—PCT/US2021/061213—ISA/EPO—Mar. 14, 2022.

Ericsson: "Physical Layer Aspects for Mobility Enhancements", 3GPP TSG-RAN WG1 Meeting #97, May 2019, vol. Ran WG1, No. Prague, CZ, 3GPP, Tdoc R1-1907434, pp. 1-8.

* cited by examiner

TECHNIQUES FOR NON-SERVING CELL REPORTING IN WIRELESS COMMUNICATIONS SYSTEMS

CROSS REFERENCE

The present application for patent claims the benefit of U.S. Provisional Patent Application No. 63/137,635 by PEZESHKI et al., entitled "TECHNIQUES FOR NON-SERVING CELL REPORTING IN WIRELESS COMMUNICATIONS SYSTEM," filed Jan. 14, 2021, assigned to the assignee hereof, and expressly incorporated by reference herein.

FIELD OF TECHNOLOGY

The following relates to wireless communication, including techniques for non-serving cell reporting in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems support inter-cell mobility where a communication device (e.g., a base station or a UE) may perform handover procedures between cells in the system based on channel conditions associated with different cells. It may be advantageous to improve efficiency and reliability of handover procedures for inter-cell mobility.

SUMMARY

The described techniques relate to improved methods, systems, devices, and apparatuses that support techniques for non-serving cell reporting in wireless communications systems. Generally, the described techniques provide for a user equipment (UE) to receive control signaling from a base station indicating a configuration for layer one (L1) measuring and reporting of downlink reference signals received from a non-serving cell. The UE may receive a set of downlink signals (e.g., a set of synchronization signal blocks (SSBs), channel state information reference signals (CSI-RSs), etc.) from a base station associated with the non-serving cell. In response to receiving the downlink reference signals, the UE may determine channel information including a set of channel metrics based on measuring the downlink reference signals. The UE may then transmit an L1 report to the base station of the serving cell indicating the channel information. The described techniques may provide improvements to handover procedures for inter-cell mobility and, in some examples, may promote enhanced efficiency for high reliability and low latency wireless communications, among other benefits.

A method for wireless communication at a UE is described. The method may include receiving control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to the serving cell, receiving, from a base station of the non-serving cell, the set of downlink reference signals, and transmitting, to a base station of the serving cell, an L1 report including channel information associated with the base station of the non-serving cell, the channel information indicating a set of channel metrics based on the set of downlink reference signals.

An apparatus for wireless communication at a UE is described. The apparatus may include a processor, memory in electronic communication with the processor, and instructions stored in the memory. The instructions may be executable by the processor to cause the apparatus to receive control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to the serving cell, receive, from a base station of the non-serving cell, the set of downlink reference signals, and transmit, to a base station of the serving cell, an L1 report including channel information associated with the base station of the non-serving cell, the channel information indicating a set of channel metrics based on the set of downlink reference signals.

Another apparatus for wireless communication at a UE is described. The apparatus may include means for receiving control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to the serving cell, means for receiving, from a base station of the non-serving cell, the set of downlink reference signals, and means for transmitting, to a base station of the serving cell, an L1 report including channel information associated with the base station of the non-serving cell, the channel information indicating a set of channel metrics based on the set of downlink reference signals.

A non-transitory computer-readable medium storing code for wireless communication at a UE is described. The code may include instructions executable by a processor to receive control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to the serving cell, receive, from a base station of the non-serving cell, the set of downlink reference signals, and transmit, to a base station of the serving cell, an L1 report including channel information associated with the base station of the non-serving cell, the channel information indicating a set of channel metrics based on the set of downlink reference signals.

In some examples of the method, apparatuses, and non-transitory computer-readable medium described herein, the set of downlink reference signals includes a set of SSBs.

In some examples of the method, apparatuses, and non-transitory computer-readable medium described herein, the set of channel metrics includes an L1 reference signal received power (RSRP) value, an L1 signal-to-interference-plus-noise-ratio (SINR) value, a layer three (L3) RSRP value, an L3 SINR value, a channel quality indicator (CQI) value, a precoding matrix indicator (PMI) value, a rank indicator (RI) value, or a layer indicator (L1) value, or a combination thereof.

Some examples of the method, apparatuses, and non-transitory computer-readable medium described herein may further include operations, features, means, or instructions for receiving an indication of a triggering condition and determining that at least one channel metric of the set of channel metrics satisfies a channel metric threshold based on the triggering condition, where transmitting the L1 report including the channel information associated with the base station of the non-serving cell may be based on determining that the at least one channel metric of the set of channel metrics satisfies the channel metric threshold.

Some examples of the method, apparatuses, and non-transitory computer-readable medium described herein may further include operations, features, means, or instructions for determining a respective channel metric threshold for each channel metric of the set of channel metrics based on the L1 configuration, where determining that the at least one channel metric of the set of channel metrics satisfies the channel metric threshold may be based on the L1 configuration.

In some examples of the method, apparatuses, and non-transitory computer-readable medium described herein, the L1 configuration includes a radio resource control (RRC) configuration.

Some examples of the method, apparatuses, and non-transitory computer-readable medium described herein may further include operations, features, means, or instructions for determining the set of channel metrics for a single downlink reference signal of the set of downlink reference signals based on the L1 configuration, where the channel information includes the set of channel metrics for the single downlink reference signal of the set of downlink reference signals.

Some examples of the method, apparatuses, and non-transitory computer-readable medium described herein may further include operations, features, means, or instructions for determining the set of channel metrics for each downlink reference signal of the set of downlink reference signals based on the L1 configuration, where the channel information includes the set of channel metrics for each downlink reference signal of the set of downlink reference signals.

Some examples of the method, apparatuses, and non-transitory computer-readable medium described herein may further include operations, features, means, or instructions for selecting one or more downlink reference signals of the set of downlink reference signals based on the L1 configuration, each downlink reference signal of the one or more downlink reference signals having a highest channel metric for each channel metric of the set of channel metrics compared to other downlink reference signals of the set of downlink reference signals and determining an average of each channel metric of the set of channel metrics associated with the one or more downlink reference signals, where the channel information includes the average of each channel metric of the set of channel metrics associated with the one or more downlink reference signals.

Some examples of the method, apparatuses, and non-transitory computer-readable medium described herein may further include operations, features, means, or instructions for determining that each channel metric of the set of channel metrics associated with one or more downlink reference signals of the set of downlink reference signals satisfies a channel metric threshold and determining an average of each channel metric of the set of channel metrics associated with each downlink reference signal of the one or more downlink reference signals, where the channel information includes the average of each channel metric of the set of channel metrics associated with each downlink signal of the one or more downlink reference signals.

Some examples of the method, apparatuses, and non-transitory computer-readable medium described herein may further include operations, features, means, or instructions for determining that each channel metric of the set of channel metrics associated with each downlink reference signal of the set of downlink reference signals does not satisfy a channel metric threshold and selecting a downlink reference signal of the set of downlink reference signals based on the L1 configuration, where the downlink reference signal may be associated with a highest channel metric for each channel metric of the set of channel metrics compared to other downlink reference signals of the set of downlink reference signals, where the channel information includes the set of channel metrics for the selected downlink reference signal of the set of downlink reference signals.

In some examples of the method, apparatuses, and non-transitory computer-readable medium described herein, transmitting the L1 report may include operations, features, means, or instructions for transmitting, in a scheduling request, the L1 report including the channel information associated with the base station of the non-serving cell.

Some examples of the method, apparatuses, and non-transitory computer-readable medium described herein may further include operations, features, means, or instructions for receiving, from the base station of the serving cell associated with the UE, an uplink grant scheduling one or more uplink resources based on a scheduling request from the UE, where transmitting the L1 report may include operations, features, means, or instructions for transmitting the L1 report including the channel information associated with the base station of the non-serving cell using the one or more uplink resources.

In some examples of the method, apparatuses, and non-transitory computer-readable medium described herein, the one or more uplink resources include physical uplink control channel (PUCCH) resources or physical uplink shared channel (PUSCH) resources, or a combination thereof.

In some examples of the method, apparatuses, and non-transitory computer-readable medium described herein, transmitting the L1 report may include operations, features, means, or instructions for transmitting, in a medium access control-control element (MAC-CE) message, the L1 report including the channel information associated with the base station of the non-serving cell based on an uplink grant.

In some examples of the method, apparatuses, and non-transitory computer-readable medium described herein, the set of downlink reference signals includes a set of CSI-RSs.

A method for wireless communication at a serving base station of a serving cell is described. The method may include transmitting, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell, receiving, from the UE, an L1 report including channel information associated with a base station of the non-serving cell, the channel information including a set of channel metrics, and performing the wireless communication with the UE based on the L1 report including the channel information associated with the base station of the non-serving cell.

An apparatus for wireless communication at a serving base station of a serving cell is described. The apparatus may include a processor, memory in electronic communication with the processor, and instructions stored in the memory. The instructions may be executable by the processor to cause the apparatus to transmit, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell, receive, from the UE, an L1 report including channel information associated with a base station of the non-serving cell, the channel information including a set of channel metrics, and perform the wireless communication with the UE based on the L1 report including the channel information associated with the base station of the non-serving cell.

Another apparatus for wireless communication at a serving base station of a serving cell is described. The apparatus may include means for transmitting, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell, means for receiving, from the UE, an L1 report including channel information associated with a base station of the non-serving cell, the channel information including a set of channel metrics, and means for performing the wireless communication with the UE based on the L1 report including the channel information associated with the base station of the non-serving cell.

A non-transitory computer-readable medium storing code for wireless communication at a serving base station of a serving cell is described. The code may include instructions executable by a processor to transmit, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell, receive, from the UE, an L1 report including channel information associated with a base station of the non-serving cell, the channel information including a set of channel metrics, and perform the wireless communication with the UE based on the L1 report including the channel information associated with the base station of the non-serving cell.

In some examples of the method, apparatuses, and non-transitory computer-readable medium described herein, the set of channel metrics includes an L1 RSRP value, an L1 SINR value, an L3 RSRP value, an L3 SINR value, a CQI value, a PMI value, an RI value, or an L1 value, or a combination thereof.

Some examples of the method, apparatuses, and non-transitory computer-readable medium described herein may further include operations, features, means, or instructions for transmitting second control signaling indicating a respective channel metric threshold for each channel metric of the set of channel metrics.

In some examples of the method, apparatuses, and non-transitory computer-readable medium described herein, the L1 configuration includes a RRC configuration.

In some examples of the method, apparatuses, and non-transitory computer-readable medium described herein, receiving the L1 report may include operations, features, means, or instructions for receiving, in a scheduling request, the L1 report including the channel information associated with the base station of the non-serving cell.

Some examples of the method, apparatuses, and non-transitory computer-readable medium described herein may further include operations, features, means, or instructions for transmitting an uplink grant scheduling one or more uplink resources based on a scheduling request from the UE, where receiving the L1 report may include operations, features, means, or instructions for receiving the L1 report including the channel information associated with the base station of the non-serving cell using the one or more uplink resources.

In some examples of the method, apparatuses, and non-transitory computer-readable medium described herein, the one or more uplink resources include PUCCH resources or PUSCH resources, or a combination thereof.

In some examples of the method, apparatuses, and non-transitory computer-readable medium described herein, receiving the L1 report may include operations, features, means, or instructions for receiving, in a medium access control-control element message, the L1 report including the channel information associated with the base station of the non-serving cell.

DETAILED DESCRIPTION

Figure 1:
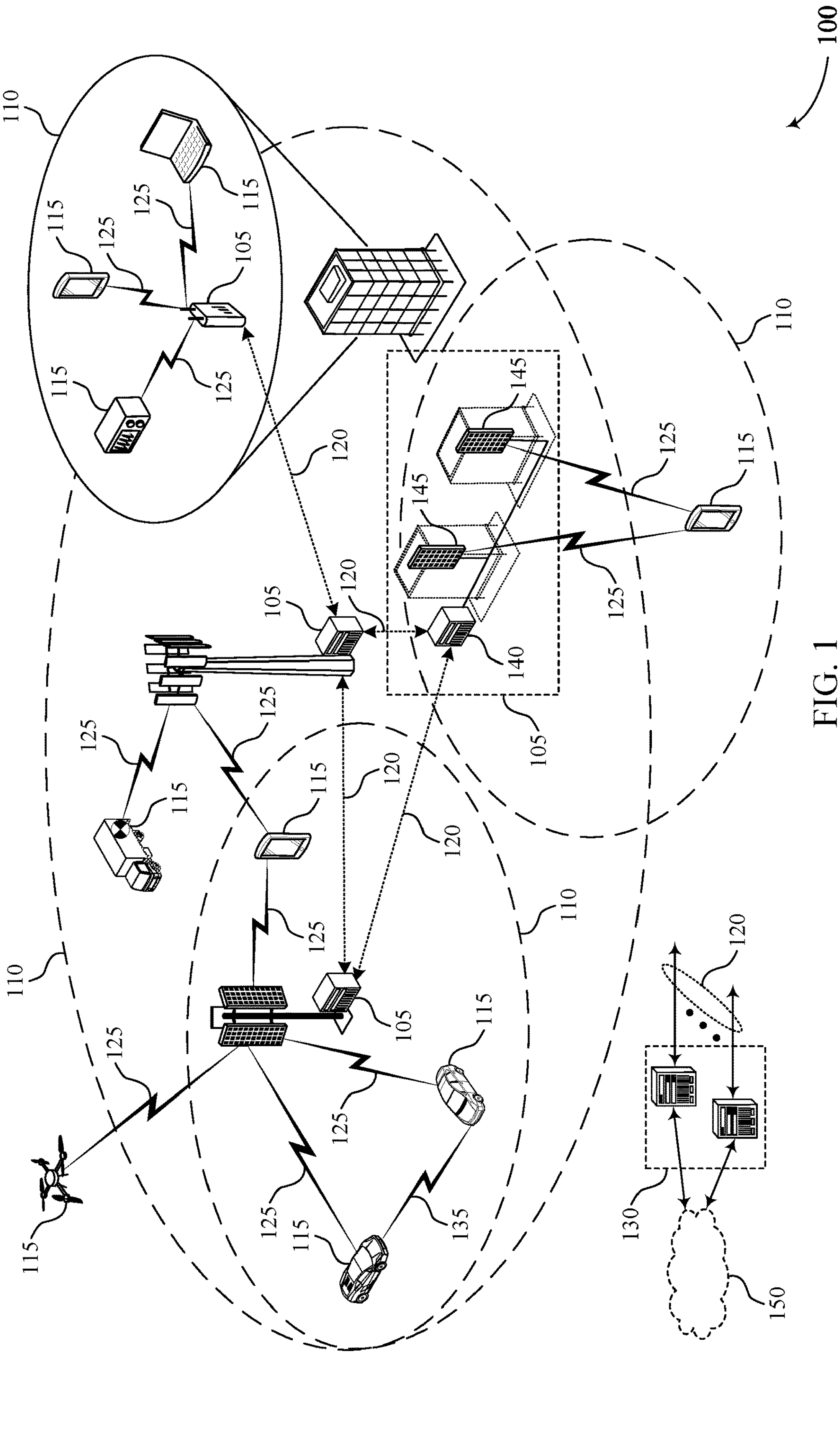
FIGS. 1 and 2 illustrate examples of wireless communications systems that support techniques for non-serving cell reporting in wireless communications systems in accordance with aspects of the present disclosure.

A wireless communications system may include various communication devices such as a user equipment (UE) and a base station, which may provide wireless communication services to the UE. For example, such a base station may be a next-generation NodeB (referred to as a gNB) that may support multiple radio access technologies (RATs) including fourth generation (4G) systems, such as 4G Long Term Evolution (LTE), as well as fifth generation (5G) systems, which may be referred to as 5G New Radio (NR). In the wireless communications system, the communication devices (e.g., UEs or base stations) may support inter-cell mobility, such that these communication devices may perform handover procedures between cells. In some examples, a communication device may support a handover procedure from one serving cell to another serving cell based in part on channel conditions on each cell. For example, a UE may perform a handover procedure if channel conditions on a neighbor cell are more favorable than channel conditions on a serving cell of the UE.

In some cases, a communication device may determine to perform a handover procedure based on layer three (L3) reporting techniques performed by the communication device. L3 may be referred to as a radio resource control (RRC) layer which handles functions such as establishment, maintenance, and release of RRC connections at a cell level. L3 reporting may be performed infrequently to allow a communication device (e.g., a base station or a UE) to track channel conditions over time for supporting inter-cell mobility. For example, a UE may measure an L3 reference signal received power (RSRP) of a non-serving cell. If the L3 RSRP of the non-serving cell is higher than an RSRP of a serving cell, the UE and a base station of the serving cell may determine to perform a handover procedure, where the UE switches service to the non-serving cell. In some cases, a communication device may report the L3 RSRP infrequently leading to an inefficiency of handover procedures. It may therefore be advantageous to improve reliability and reduce latency for handover procedures.

The wireless communications systems may also support lower layer (e.g., layer one (L1) or layer two (L2)) handover procedures. For example, a UE may be served by one or more serving cells. The UE may be handed over or reassigned serving cells over time as channel conditions change, as the UE moves in the wireless communications systems, etc. This change in serving cells may be referred to as inter-cell mobility, and in some cases, may be referred to as L1/L2 inter-cell mobility. A communication device may thus support performing handover procedures based on L1 or L2 signaling. L1 may be referred to as a physical layer which handles functions such as modulation and demodulation of physical channels (e.g., physical uplink shared channel (PUSCH), physical uplink control channel (PUCCH), etc.). L2 may be referred to as a medium access control (MAC), radio link control (RLC), or a packet data convergence protocol (PDCP) layer which handle functions such as beam management, random access procedures, mapping between logical and physical channels, etc. In some examples, L1 or L2 signaling may occur more frequently than L3 signaling. Thus, handover procedures based on L1 or L2 signaling may be dynamic and exhibit a higher efficiency and reduced latency when compared to L3 handover procedures.

A communication device (e.g., a UE) may use L1 reporting techniques for downlink signals (e.g., synchronization signal blocks (SSBs) or reference signals, such as channel state information reference signals (CSI-RSs)) received from base stations of serving cells. In some examples, L1 reporting may be performed more frequently at a beam level to provide information associated with channel conditions at a moment in time. Accordingly, it may be advantageous for a communication device to use L1 reporting techniques for downlink signals received from other communication devices (e.g., base stations) of non-serving cells to increase a frequency of reporting or an amount of information associated with channel conditions on neighboring cells provided to communication devices (e.g., base stations) of serving cells. By implementing L1 reporting, the communication devices may increase an efficiency or decrease a latency associated with handover procedures in wireless communications systems which support inter-cell mobility.

Some techniques for L1 reporting on non-serving cells include, for example, a base station of a serving cell for a UE transmitting control signaling to the UE indicating a configuration for L1 measuring and reporting of downlink signals from a non-serving cell. Based on the configuration, the UE may determine channel metrics to report to the base station. In some examples, the channel metrics may include an L1 RSRP, an L1 signal-to-interference-plus-noise-ratio (SINR), an L3 RSRP, an L3 SINR, a channel quality indicator (CQI), a precoding matrix indicator (PMI), a rank indicator (RI), a layer indicator (L1), or any combination thereof. In some examples, the UE may also determine a trigger condition (e.g., thresholds) associated with the channel metrics and indicating a frequency or condition under which the UE should report the channel metrics.

The UE may receive a set of downlink signals (e.g., refence signals) from a base station of a non-serving cell. The UE may measure or otherwise use the downlink signals to determine channel information including the channel metrics. The UE may then transmit an L1 report to the base station of the serving cell including the channel information. In some examples, the UE may transmit the L1 report in a scheduling request. In some examples, the UE may transmit the L1 report in a MAC control element (MAC-CE) on a PUCCH transmission. Performing L1 reporting techniques of non-serving cell reference signals may allow a UE to provide information to a base station frequently which may increase an efficiency or reduce a latency of handover procedures in systems which support inter-cell mobility.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to techniques for non-serving cell reporting in wireless communications systems.

FIG. 1 illustrates an example of a wireless communications system 100 that supports techniques for non-serving cell reporting in wireless communications systems in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded.

The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. A RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support inter-cell mobility such that a UE 115 or a base station 105 may initiate handover procedures to switch the UE 115 from a serving cell to a different serving cell. In some cases, a base station 105 or a UE 115 may determine to perform handover procedures based on channel conditions between cells. For example, a UE 115 may report channel information associated with a non-serving cell to a base station 105 of the serving cell and determine to perform a handover procedure based in part on which cell has more favorable channel conditions (e.g., higher RSRP, SINR, etc.). In some examples, a UE 115 may perform L1 reporting techniques to provide information to a base station 105 of a serving cell more frequently which may lead to an increased reliability or efficiency of handover procedures in the wireless communications system 100.

Figure 2:
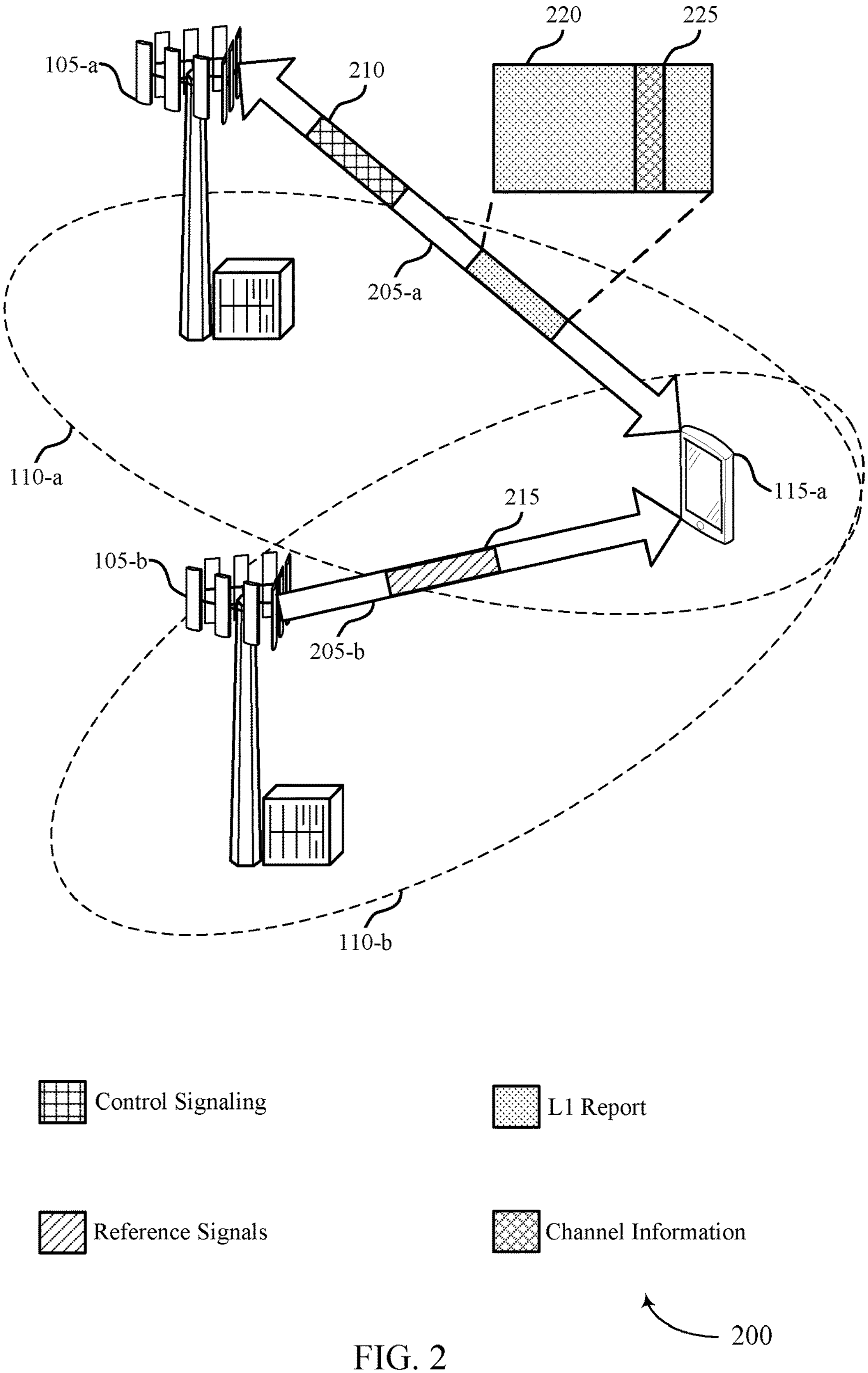

FIG. 2 illustrates an example of a wireless communications system 200 that supports techniques for non-serving cell reporting in wireless communications systems in accordance with one or more aspects of the present disclosure. In some examples, the wireless communications system 200 may implement aspects of the wireless communications system 100 or may be implemented by aspects of the wireless communications system 100. For example, the wireless communications system 200 may include a base station 105-*a*, a base station 105-*b*, and a UE 115-*a*, which may be examples of the corresponding devices described herein. The base station 105-*a* and the base station 105-*b* may be associated with cells providing wireless communications services within respective coverage area 110-*a* and coverage area 110-*b*. In some examples, the UE 115-*a* may operate in an overlapping portion of the coverage area 110-*a* and the coverage area 110-*b*, such that the UE 115-*a* may communicate with the base station 105-*a* via a channel 205-*a* and may communicate with the base station 105-*b* via a channel 205-*b*. In some examples, the base station 105-*a* may be associated with a serving cell of the UE 115-*a* and the base station 105-*b* may be associated with a non-serving cell (e.g., a neighboring cell).

The wireless communications system 200 may support inter-cell mobility so that the UE 115-*a* may perform a handover procedure to switch service from one cell (e.g., the cell associated with the base station 105-*a*) to another cell (e.g., the cell associated with the base station 105-*b*). In some examples, the UE 115-*a* or the base station 105-*a* may perform a handover procedure based on channel conditions between the UE 115-*a* and the base station 105-*a*, as well as the base station 105-*b* (e.g., conditions associated with the channel 205-*a* and the channel 205-*b*). To facilitate inter-cell mobility, the UE 115-*a* may use L1 measurement and reporting techniques to report information associated with the channel 205-*b* to the base station 105-*a*. That is, for L1 (e.g., and L2) based mobility may reduce latency and increase the rate at which the UE 115-*a* may switch between cells.

For L1 measurement and reporting, the base station 105-*a* may transmit control signaling 210 (e.g., RRC signaling) to the UE 115-*a*. The control signaling 210 may indicate a configuration for the UE 115-*a* to perform L1 measurements of downlink reference signals from the base station 105-*b* (e.g., on the non-serving cell) and to perform L1 reporting of channel information 225 associated with the measured reference signals (e.g., conditions associated with the channel 205-*b*). The control signaling 210 may indicate channel metrics which the UE 115-*a* is to include in the channel information 225. In some examples, the base station 105-*a* may configure the UE 115-*a* to periodically report the channel information 225. Alternatively, the base station 105-*a* may configure the UE 115-*a* to report the channel information 225 when one or more channel metrics associated with the channel information 225 satisfy a threshold (e.g., a triggering condition). The base station 105-*a* may configure the UE 115-*a* with a different threshold for each channel metric associated with the channel information 225.

The UE 115-*a* may receive a set of downlink signals 215 (e.g., a set of downlink reference signals) from the base station 105-*b* and, based on the control signaling 210 received from the base station 105-*a*, may measure and report channel information 225 associated with the channel 205-*b*. For example, the UE 115-*a* may receive the set of downlink signals 215 (e.g., a set of SSBs or a set of CSI-RSs) from the base station 105-*b* and determine channel information 225 including a set of channel metrics determined by the UE 115-*a* based on measuring the set of downlink signals 215. For example, the UE 115-*a* may determine an L1 RSRP, an L1 SINR, an L3 RSRP, an L3 SINR, a CQI, a PMI, an RI, an L1, or any combination thereof associated with the channel 205-*b* based on measuring the set of downlink signals 215.

In some examples, the set of downlink signals 215 may include a single reference signal such that the UE 115-*a* determines the channel metrics for one reference signal. In some examples, the UE 115-*a* may determine the channel metrics for each reference signal of the set of downlink signals 215. The UE 115-*a* may then calculate an average for each channel metric such that the channel information 225 includes the average value of each channel metric. For example, the UE 115-*a* may determine a set of RSRP values based on the set of downlink signals 215 and may calculate an average RSRP value based on the set of RSRP values. Additionally or alternatively, the UE 115-*a* may determine a set of SINR values and determine an average SINR value, or may determine a set of RI values and determine an average RI values based on the set of downlink signals 215.

In some examples, the UE 115-*a* may calculate the average using downlink reference signals for which the channel metrics satisfy a threshold (e.g., as configured by the base station 105-*a* via the control signaling 210). For example, the UE 115-*a* may determine that one or more RSRP values associated with the set of downlink signals 215 satisfy a RSRP threshold and may select these RSRP values for calculating the average RSRP value accordingly. Additionally or alternatively, the UE 115-*a* may determine that one or more SINR values satisfy a SINR threshold and may use these SINR values for calculating the average SINR value. Similarly, the UE 115-*a* may select a set of RI values which satisfy a RI threshold and use the set of RI values to calculate an average RI value. The UE 115-*a* may calculate the average based on selecting a number of downlink reference signals for which the channel metrics are highest (e.g., above a threshold). If the UE 115-*a* determines that no channel metrics satisfy the threshold, the UE 115-*a* may select a downlink reference signal having higher channel metrics than any other downlink reference signal such that the channel information 225 includes the channel metrics associated with the selected downlink reference signal.

The UE 115-*a* may transmit an L1 report 220 including the channel information 225 associated with the channel 205-*b* to the base station 105-*a*. In some examples, the UE 115-*a* may transmit the L1 report 220 in a scheduling request. For example, the UE 115-*a* may transmit a scheduling request to the base station 105-*a* requesting resources to transmit the L1 report 220. In response, the base station 105-*a* may transmit an uplink grant scheduling resources (e.g., on a PUSCH or a PUCCH) for the UE 115-*a* to use to transmit the L1 report 220. In some other examples, the UE 115-*a* may transmit the L1 report 220 on previously configured resources for uplink transmission. In other examples, the UE 115-*a* may transmit the L1 report 220 in a MAC-CE (e.g., on a PUCCH).

The base station 105-*a* and the UE 115-*a* may communicate based on performing L1 measurement and reporting of the non-serving cell associated with the base station 105-*b*. In some examples, the base station 105-*a* or the UE 115-*a* may determine to perform a handover procedure based on the channel information 225. In the wireless communication system 200, the UE 115-*a* may thus be configured to support improvements to handover procedures for inter-cell mobility and, in some examples, may promote enhanced efficiency for high reliability and low latency wireless communications, among other benefits.

Figure 3:
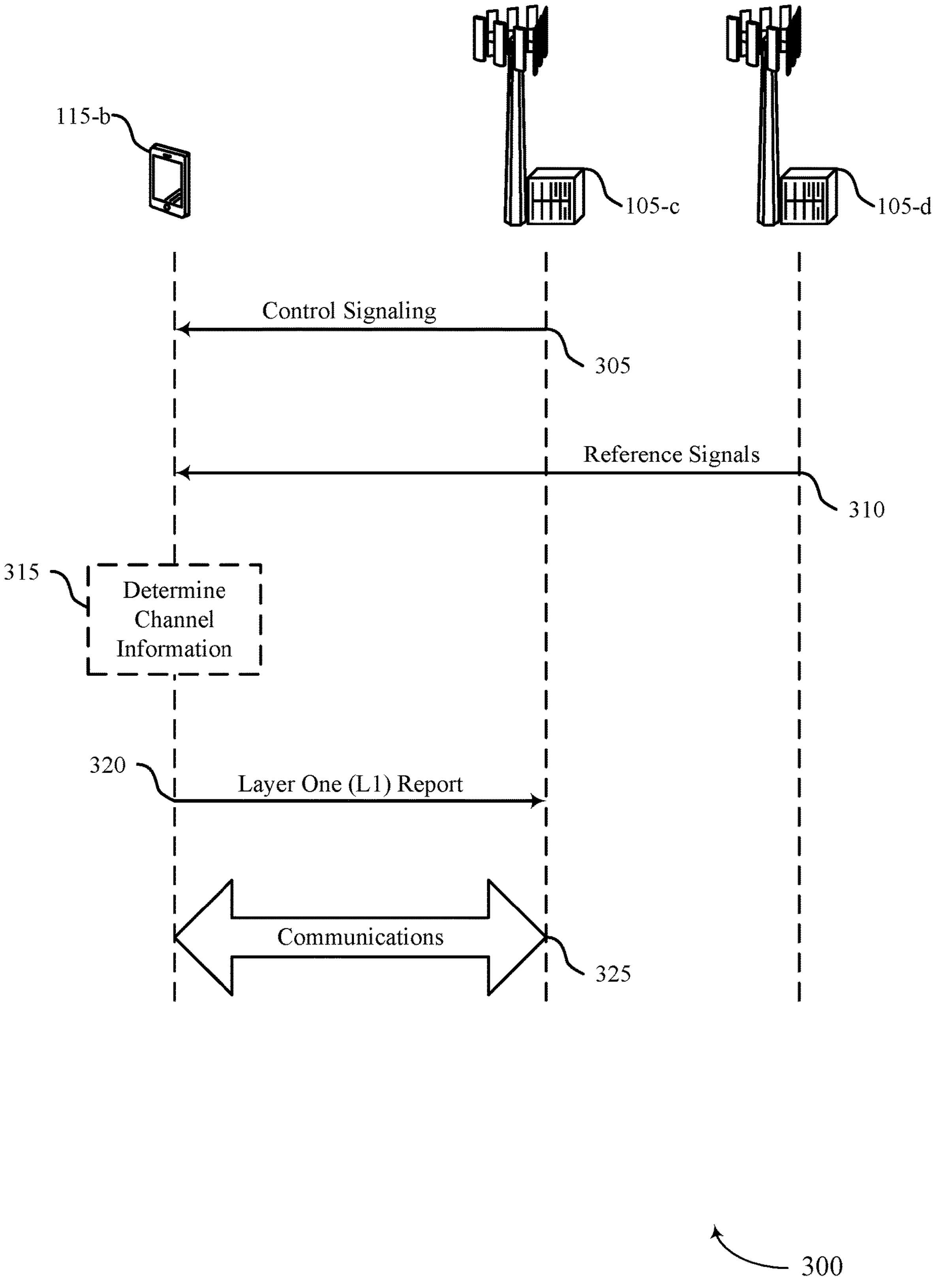
FIG. 3 illustrates an example of a process flow that supports techniques for non-serving cell reporting in wireless communications systems in accordance with aspects of the present disclosure.

FIG. 3 illustrates an example of a process flow 300 that supports techniques for non-serving cell reporting in wireless communications systems in accordance with one or more aspects of the present disclosure. The process flow 300 may implement aspects of the wireless communications systems 100 and 200 or may be implemented by aspects of the wireless communications system 100 and 200 as described with reference to FIGS. 1 and 2. The process flow 300 may include a base station 105-*c*, a base station 105-*d*, and a UE 115-*b*, which may be examples of the corresponding devices described herein. In the following description of the process flow 300, the operations between the base station 105-*c*, the base station 105-*d*, and the UE 115-*b* may be transmitted in a different order than the example order shown, or the operations performed by the base station 105-*c*, the base station 105-*d*, and the UE 115-*b* may be performed in different orders or at different times. Some operations may also be omitted from the process flow 300, and other operations may be added to the process flow 300.

In the example of FIG. 3, the base station 105-*c* may be associated with a serving cell of the UE 115-*b*, while the base station 105-*d* may be associated with a non-serving cell. At 305, the base station 105-*c* may transmit control signaling to the UE 115-*b*. The control signaling may indicate, to the UE 115-*b*, a configuration (e.g., an L1 configuration) for L1 measuring and reporting of channel information associated with downlink reference signals from the base station 105-*d*. The configuration may include indications of channel metrics the UE 115-*b* is to measure and report. The configuration may also include indications of triggering conditions (e.g., thresholds) associated with all or each of the channel metrics the UE 115-*b* is to measure and report. The configuration may also include an indication that the UE 115-*b* is to report the channel information periodically. At 310, the base station 105-*d* may transmit a set of downlink signals to the UE 115-*b*. In some examples, the set of downlink signals may include one or more SSBs, CSI-RSs, etc.

In some examples, the UE 115-*b* may, at 315, determine channel information based on receiving the set of downlink signals received from the base station 105-*d*. The channel information may include of one or more channel metrics determined by the UE 115-*b* for each received reference signal. For example, the UE 115-*b* may determine one or more of an L1 RSRP, an L1 SINR, an L3 RSRP, an L3 SINR, a CQI, a PMI, an RI, or an L1, or a combination thereof for each of the received reference signals. In some examples, the set of downlink signals may include one reference signal such that the channel information includes of channel metrics associated with the one reference signal. In some examples, the UE 115-*b* may calculate an average value for each channel metric based on the channel metrics determined for each reference signal. For example, the UE 115-*b* may determine a set of CQI values based on the received reference signals and calculate an average CQI value using the set of CQI values. Additionally or alternatively, the UE 115-*b* may determine a set of PMI values and calculate an average PMI value accordingly. In some other examples, the UE 115-*b* may exclusively use reference signals for which the associated channel metrics satisfy a threshold for calculating the average. For example, the UE 115-*b* may determine that a set of L1 values satisfy an L1 threshold and select the L1 values for calculating the average based on the L1 values satisfying the L1 threshold. The UE 115-*b* may select a number of reference signals having the highest associated channel metrics for calculating the average. In some examples, when the UE 115-*b* determines that no reference signals have associated channel metrics which satisfy the threshold, the UE 115-*b* may select one reference signal having the highest associated channel metrics.

At 320, the UE 115-*b* may transmit an L1 report including the channel information to the base station 105-*c*. In some examples, the UE 115-*b* may transmit the L1 report in a scheduling request to the base station 105-*c*. In some examples, the UE 115-*b* may receive an uplink grant scheduling resources for one or more uplink channels (e.g., a PUSCH or a PUCCH) on which the UE 115-*b* is to transmit the L1 report and may transmit the L1 report accordingly. In some examples, the UE 115-*b* may transmit the L1 report in a MAC-CE included in a PUCCH transmission. At 325, the UE 115-*b* and the base station 105-*c* may communicate based on the L1 measurement and reporting techniques. Implementing the process flow 300 may allow for the base station 105-*c* to receive channel information associated with non-serving cells (e.g., associated with the base station 105-*d*) more frequently and efficiently such that the base station 105-*c* and the UE 115-*b* may perform handover procedures with the base station 105-*d* based on applicable channel information.

Figure 4:
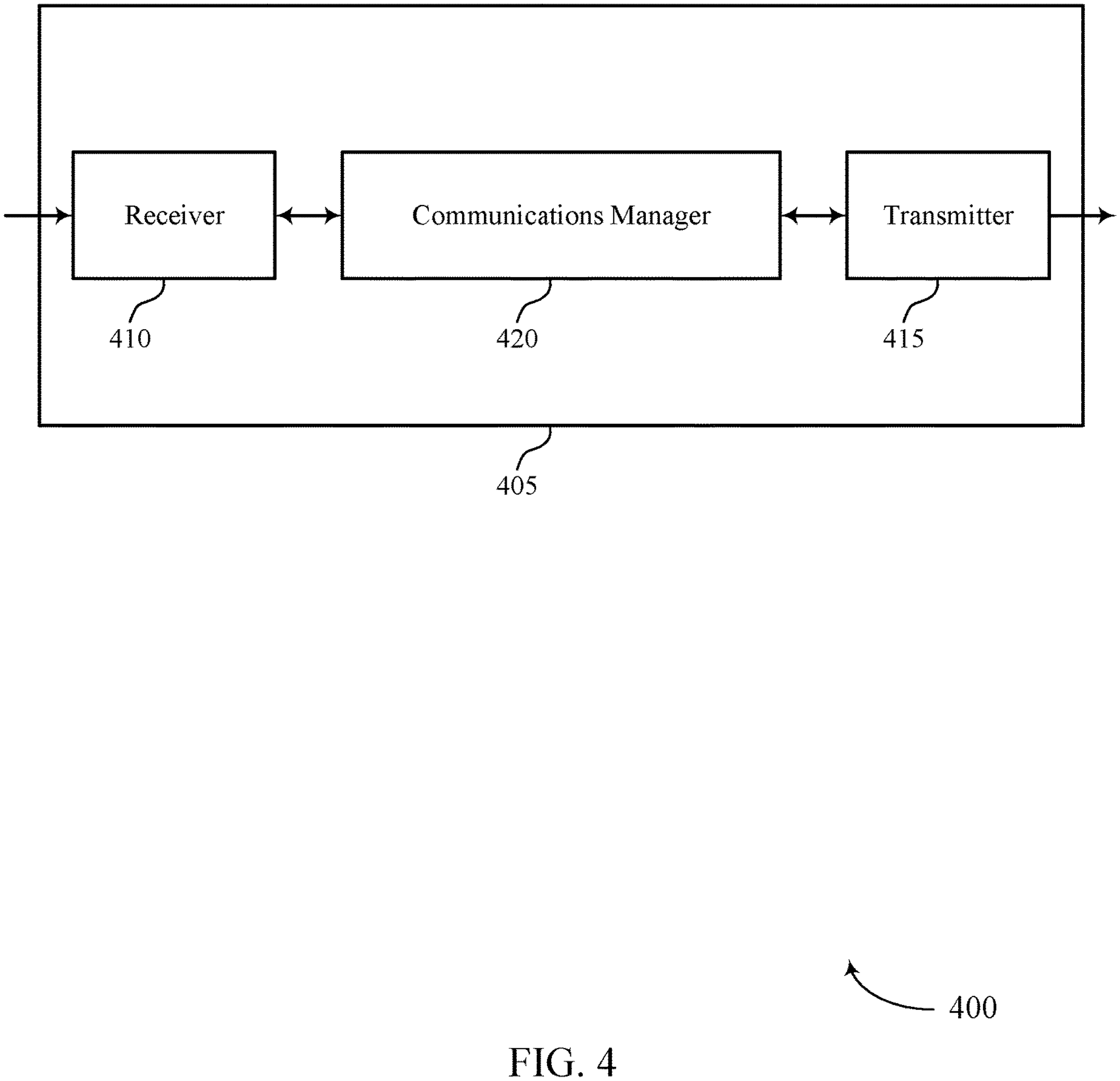
FIGS. 4 and 5 show block diagrams of devices that support techniques for non-serving cell reporting in wireless communications systems in accordance with aspects of the present disclosure.

FIG. 4 shows a block diagram 400 of a device 405 that supports techniques for non-serving cell reporting in wireless communications systems in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for non-serving cell reporting in wireless communications systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for non-serving cell reporting in wireless communications systems). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for non-serving cell reporting in wireless communications systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE (e.g., the device 405) in accordance with examples as disclosed herein. For example, the communications manager 420 may be configured as or otherwise support a means for receiving control signaling indicating a configuration for L1 measuring of downlink reference signals from a non-serving cell for the UE and L1 reporting of the measured downlink reference signals to a serving cell of the UE. The communications manager 420 may be configured as or otherwise support a means for receiving, from a base station of the non-serving cell, a set of downlink signals. The communications manager 420 may be configured as or otherwise support a means for determining channel information including a set of channel metrics based on the set of downlink signals and the configuration. The communications manager 420 may be configured as or otherwise support a means for transmitting, to a base station of the serving cell, an L1 report including the channel information based on the configuration.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for non-serving cell L1 measurement and reporting. Based on techniques for L1 measurement and reporting, the device 405 may exhibit, for example, improved communication reliability, reduced latency, reduced power consumption, more efficient utilization of communication resources, improved coordination between devices, or longer battery life, among other benefits.

Figure 5:
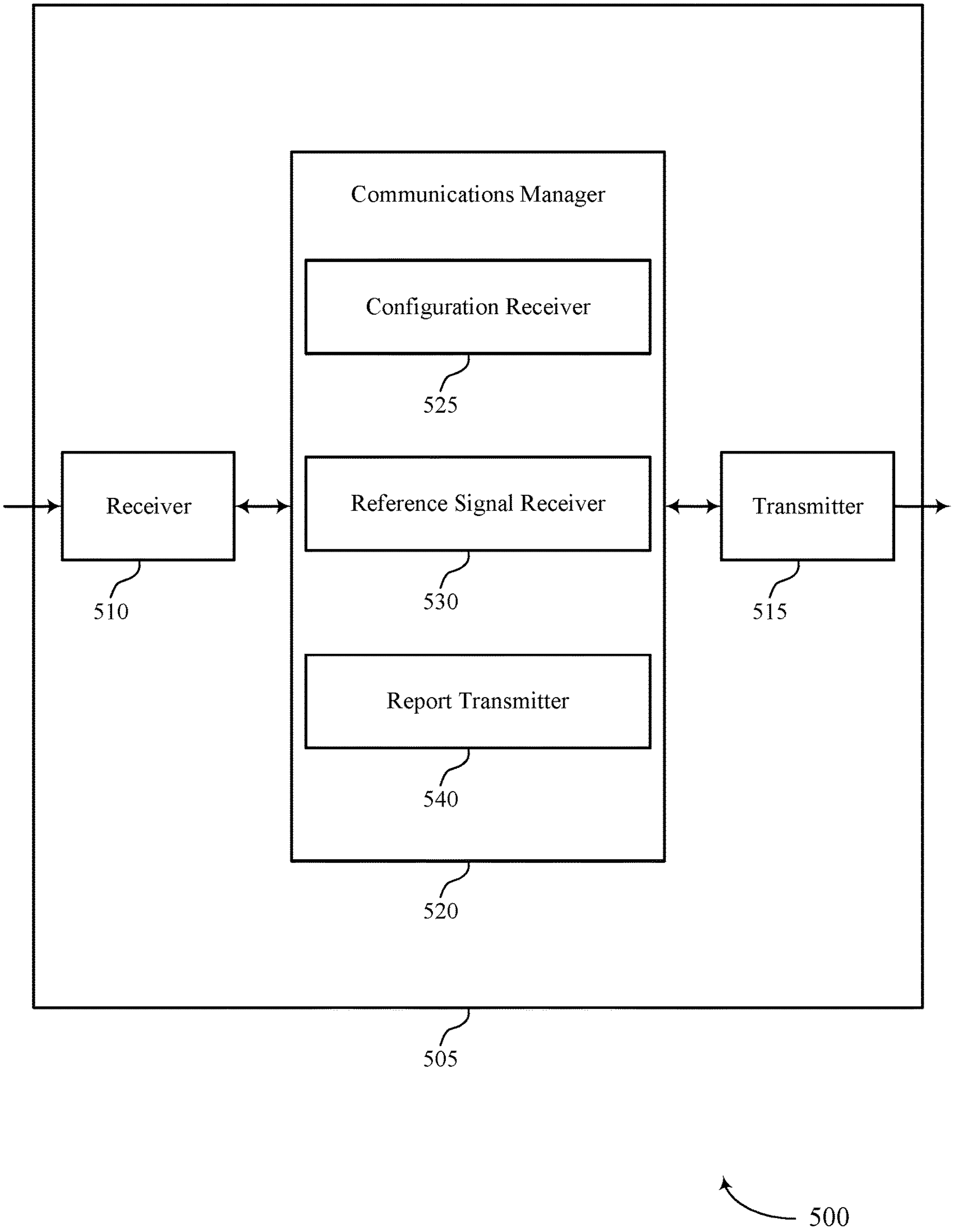

FIG. 5 shows a block diagram 500 of a device 505 that supports techniques for non-serving cell reporting in wireless communications systems in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for non-serving cell reporting in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for non-serving cell reporting in wireless communications systems). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for non-serving cell reporting in wireless communications systems as described herein. For example, the communications manager 520 may include a configuration receiver 525, a reference signal receiver 530, a report transmitter 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE (e.g., the device 505) in accordance with examples as disclosed herein. The configuration receiver 525 may be configured as or otherwise support a means for receiving control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to a serving cell. The reference signal receiver 530 may be configured as or otherwise support a means for receiving, from a base station of the non-serving cell, a set of downlink reference signals. The report transmitter 540 may be configured as or otherwise support a means for transmitting, to a base station of the serving cell, an L1 report including the channel information associated with the base station of the non-serving cell, the channel information indicating a set of channel metrics based on the set of downlink reference signals.

Figure 6:
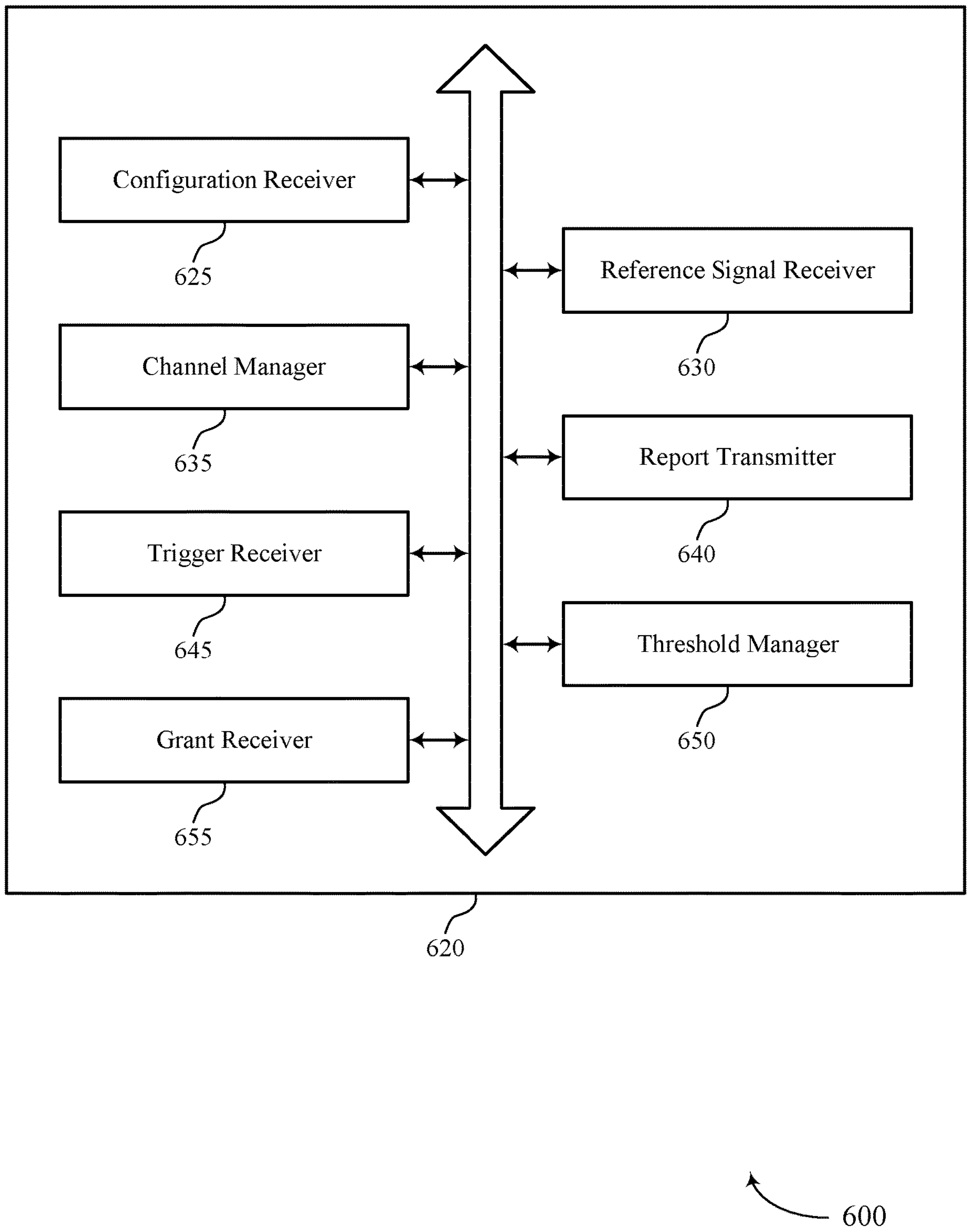
FIG. 6 shows a block diagram of a communications manager that supports techniques for non-serving cell reporting in wireless communications systems in accordance with aspects of the present disclosure.

FIG. 6 shows a block diagram 600 of a communications manager 620 that supports techniques for non-serving cell reporting in wireless communications systems in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for non-serving cell reporting in wireless communications systems as described herein. For example, the communications manager 620 may include a configuration receiver 625, a reference signal receiver 630, a channel manager 635, a report transmitter 640, a trigger receiver 645, a threshold manager 650, a grant receiver 655, or any combination thereof. Each of these components may communicate, directly or indirectly, with one another (e.g., via one or more buses).

The communications manager 620 may support wireless communication at a UE in accordance with examples as disclosed herein. The configuration receiver 625 may be configured as or otherwise support a means for receiving control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to the serving cell. The reference signal receiver 630 may be configured as or otherwise support a means for receiving, from a base station of the non-serving cell, the set of downlink reference signals. The report transmitter 640 may be configured as or otherwise support a means for transmitting, to a base station of the serving cell, an L1 report including channel information associated with the base station of the non-serving cell, the channel information indicating a set of channel metrics based on the set of reference signals.

In some examples, the trigger receiver 645 may be configured as or otherwise support a means for receiving an indication of a triggering condition. In some examples, the threshold manager 650 may be configured as or otherwise support a means for determining that at least one channel metric of the set of channel metrics satisfies a channel metric threshold based on the triggering condition, where transmitting the L1 report including the channel information associated with the base station of the non-serving cell is based on determining that the at least one channel metric of the set of channel metrics satisfies the channel metric threshold. In some examples, the threshold manager 650 may be configured as or otherwise support a means for determining a respective channel metric threshold for each channel metric of the set of channel metrics based on the L1 configuration, where determining that the at least one channel metric of the set of channel metrics satisfies the channel metric threshold is based on the L1 configuration. In some examples, the L1 configuration includes an RRC configuration.

The channel manager 635 may be configured as or otherwise support a means for determining the set of channel metrics for a single downlink reference signal of the set of downlink reference signals based on the L1 configuration. The channel information includes the set of channel metrics for the single downlink reference signal of the set of downlink reference signals. In some examples, the channel manager 635 may be configured as or otherwise support a means for determining the set of channel metrics for each downlink signal of the set of downlink signals based on the L1 configuration. The channel information includes the set of channel metrics for each downlink reference signal of the set of downlink reference signals.

In some examples, the channel manager 635 may be configured as or otherwise support a means for selecting one or more downlink reference signals of the set of downlink reference signals based on the L1 configuration. Each downlink reference signal of the one or more downlink reference signals having a highest channel metric for each channel metric of the set of channel metrics compared to other downlink reference signals of the set of downlink reference signals. In some examples, the channel manager 635 may be configured as or otherwise support a means for determining an average of each channel metric of the set of channel metrics associated with the one or more downlink reference signals. The channel information includes the average of each channel metric of the set of channel metrics associated with the one or more downlink reference signals.

The threshold manager 650 may be configured as or otherwise support a means for determining that each channel metric of the set of channel metrics associated with one or more downlink reference signals of the set of downlink reference signals satisfies a channel metric threshold. In some examples, the channel manager 635 may be configured as or otherwise support a means for determining an average of each channel metric of the set of channel metrics associated with each downlink reference signal of the one or more downlink reference signals. The channel information includes the average of each channel metric of the set of channel metrics associated with each downlink reference signal of the one or more downlink reference signals.

In some examples, the threshold manager 650 may be configured as or otherwise support a means for determining that each channel metric of the set of channel metrics associated with each downlink reference signal of the set of downlink reference signals does not satisfy a channel metric threshold. In some examples, the channel manager 635 may be configured as or otherwise support a means for selecting a downlink reference signal of the set of downlink reference signals based on the L1 configuration. The downlink reference signal is associated with a highest channel metric for each channel metric of the set of channel metrics compared to other downlink reference signals of the set of downlink reference signals. The channel information includes the set of channel metrics for the selected downlink reference signal of the set of downlink reference signals.

In some examples, to support transmitting the L1 report, the report transmitter 640 may be configured as or otherwise support a means for transmitting, in a scheduling request, the L1 report including the channel information associated with the base station of the non-serving cell. In some examples, the grant receiver 655 may be configured as or otherwise support a means for receiving, from the base station of the serving cell associated with the UE, an uplink grant scheduling one or more uplink resources based on a scheduling request from the UE. In some examples, to transmit the L1 report, the report transmitter 640 may be configured as or otherwise support a means for transmitting the L1 report including the channel information associated with the base station of the non-serving cell using the one or more uplink resources. In some examples, the one or more uplink resources include PUCCH resources or PUSCH resources, or a combination thereof.

In some examples, to support transmitting the L1 report, the report transmitter 640 may be configured as or otherwise support a means for transmitting, in a MAC-CE message, the L1 report including the channel information associated with the base station of the non-serving cell based on an uplink grant. In some examples, the set of downlink reference signals includes a set of CSI-RSs. In some examples, the set of downlink signals includes a set of SSBs. In some examples, the set of channel metrics includes an L1 RSRP value, an L1 SINR value, an L3 RSRP value, an L3 SINR value, a CQI value, a PMI value, an RI value, or an L1 value, or a combination thereof.

Figure 7:
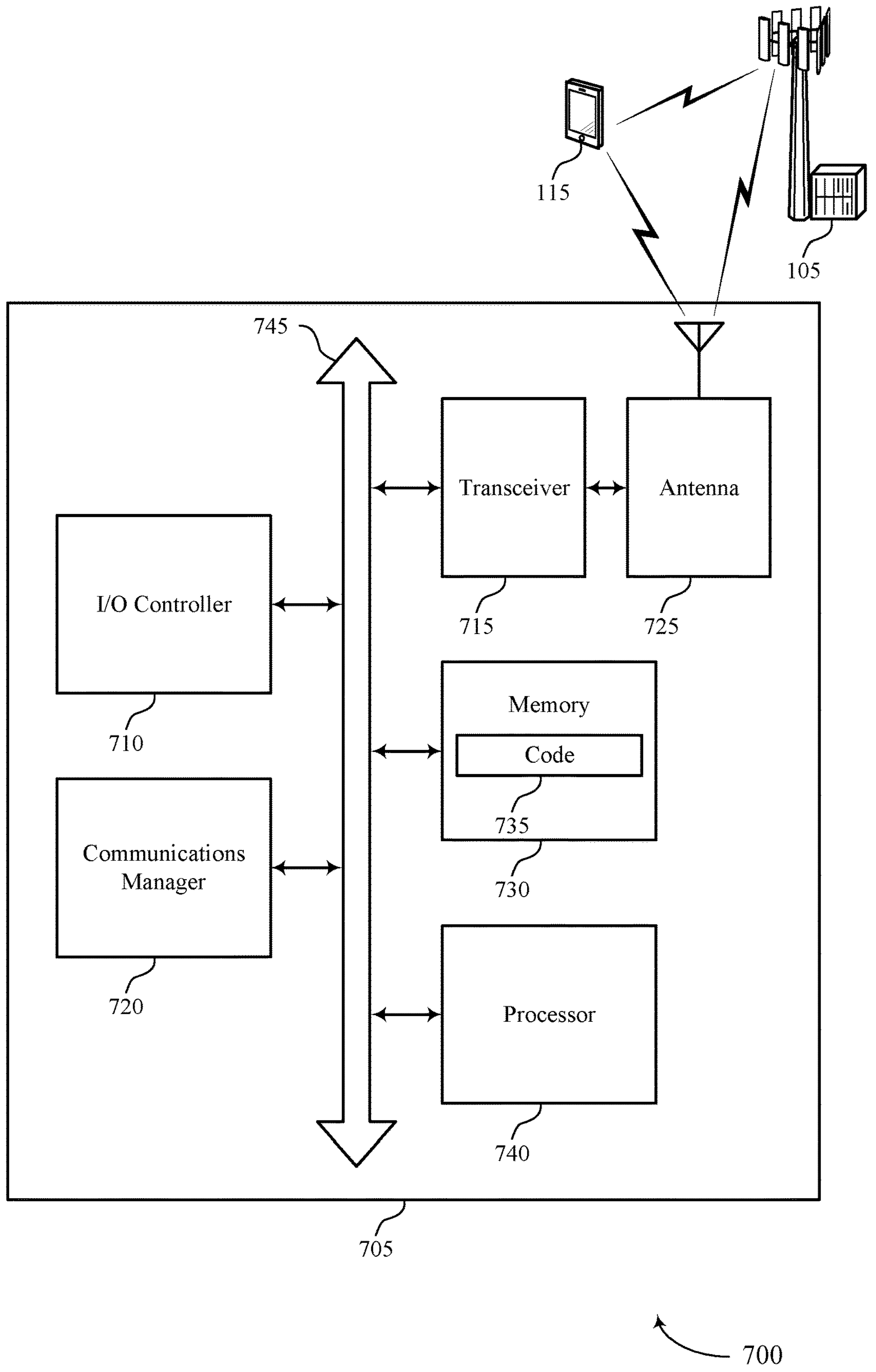
FIG. 7 shows a diagram of a system including a device that supports techniques for non-serving cell reporting in wireless communications systems in accordance with aspects of the present disclosure.

FIG. 7 shows a diagram of a system 700 including a device 705 that supports techniques for non-serving cell reporting in wireless communications systems in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for non-serving cell reporting in wireless communications systems). For example, the device 705 or a component of the device 705 may include a processor 740 and memory 730 coupled with the processor 740, the processor 740 and memory 730 configured to perform various functions described herein.

The communications manager 720 may support wireless communication at a UE (e.g., the device 705) in accordance with examples as disclosed herein. For example, the communications manager 720 may be configured as or otherwise support a means for receiving control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to a serving cell. The communications manager 720 may be configured as or otherwise support a means for receiving, from a base station of the non-serving cell, the set of downlink reference signals. The communications manager 720 may be configured as or otherwise support a means for transmitting, to a base station of the serving cell, an L1 report including channel information associated with the base station of the non-serving cell, the channel information indicating a set of channel metrics based on the set of downlink reference signals. By including or configuring the communications manager 720 in accordance with examples as described herein, the device 705 may support techniques for L1 reporting of non-serving cell channel information. Based on techniques for L1 reporting, the device 705 may exhibit, for example, improved communication reliability, reduced latency, reduced power consumption, more efficient utilization of communication resources, improved coordination between devices, or longer battery life, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for non-serving cell reporting in wireless communications systems as described herein, or the processor 740 and the memory 730 may be otherwise configured to perform or support such operations.

Figure 8:
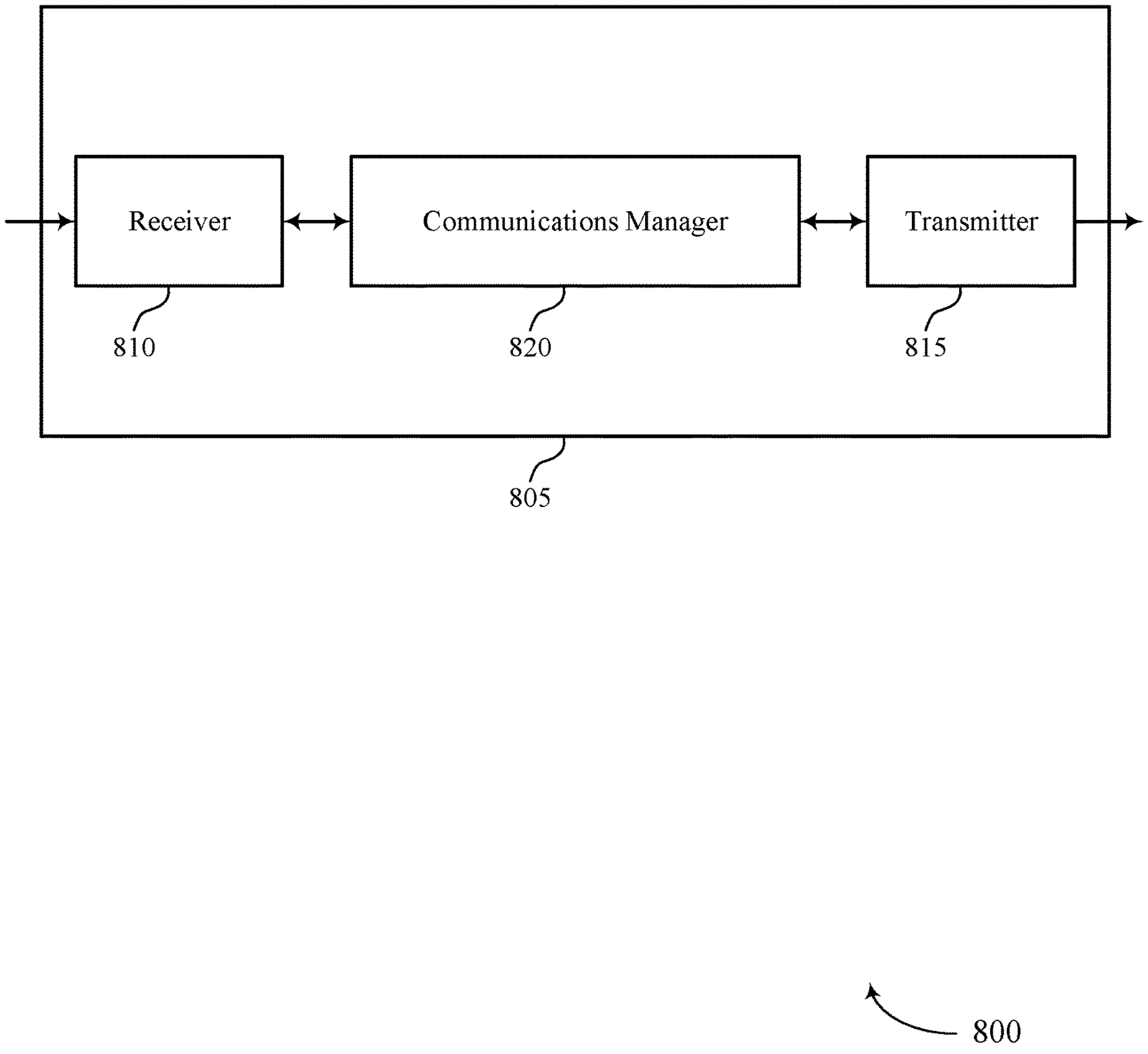
FIGS. 8 and 9 show block diagrams of devices that support techniques for non-serving cell reporting in wireless communications systems in accordance with aspects of the present disclosure.

FIG. 8 shows a block diagram 800 of a device 805 that supports techniques for non-serving cell reporting in wireless communications systems in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for non-serving cell reporting in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for non-serving cell reporting in wireless communications systems). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for non-serving cell reporting in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure.

In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a serving base station (e.g., the device 805) of a serving cell in accordance with examples as disclosed herein. For example, the communications manager 820 may be configured as or otherwise support a means for transmitting, control signaling indicating an L1 configuration associated with inter-cell mobility from the serving cell to a non-serving cell for a UE, the L1 configuration for measuring a set of downlink reference signals from the non-serving cell and L1 reporting of measurements of the set of downlink reference signals to the serving cell. The communications manager 820 may be configured as or otherwise support a means for receiving, from the UE, an L1 report including channel information associated with a base station of the non-serving cell, the channel information indicating a set of channel metrics. The communications manager 820 may be configured as or otherwise support a means for performing the wireless communication with the UE based on the L1 report including the channel information associated with the base station of the non-serving cell.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for L1 reporting of channel information associated with non-serving cells. Based on techniques for L1 reporting, the device 805 may exhibit, for example, reduced latency, increased reliability, reduced processing, reduced power consumption, or more efficient utilization of communication resources, among other benefits.

Figure 9:
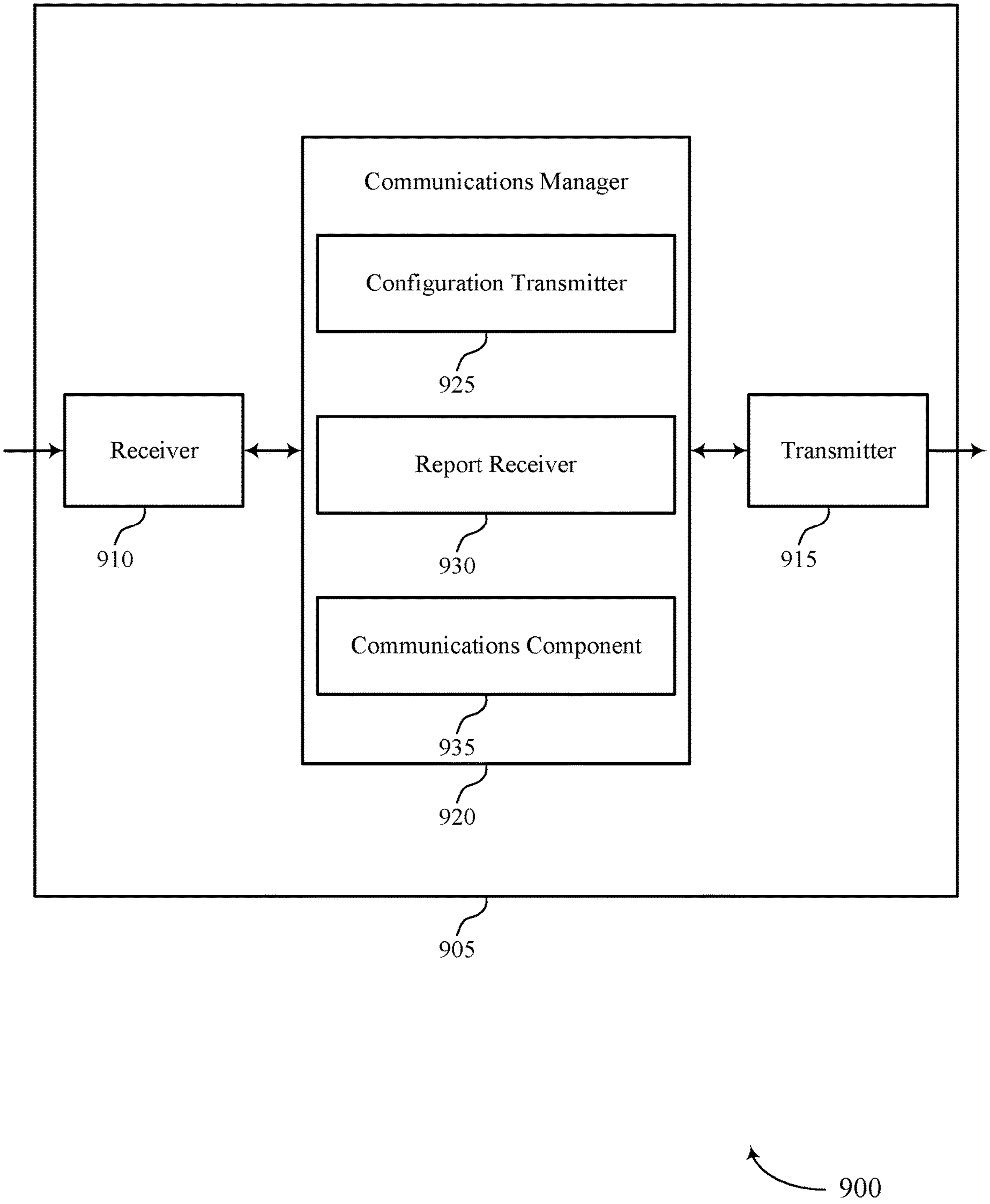

FIG. 9 shows a block diagram 900 of a device 905 that supports techniques for non-serving cell reporting in wireless communications systems in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for non-serving cell reporting in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for non-serving cell reporting in wireless communications systems). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for non-serving cell reporting in wireless communications systems as described herein. For example, the communications manager 920 may include a configuration transmitter 925, a report receiver 930, a communications component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a serving base station (e.g., the device 905) of a serving cell in accordance with examples as disclosed herein. The configuration transmitter 925 may be configured as or otherwise support a means for transmitting, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell. The report receiver 930 may be configured as or otherwise support a means for receiving, from the UE, an L1 report including channel information associated with a base station of the non-serving cell, the channel information indicating a set of channel metrics. The communications component 935 may be configured as or otherwise support a means for performing the wireless communication with the UE based on the L1 report including the channel information associated with the base station of the non-serving cell.

Figure 10:
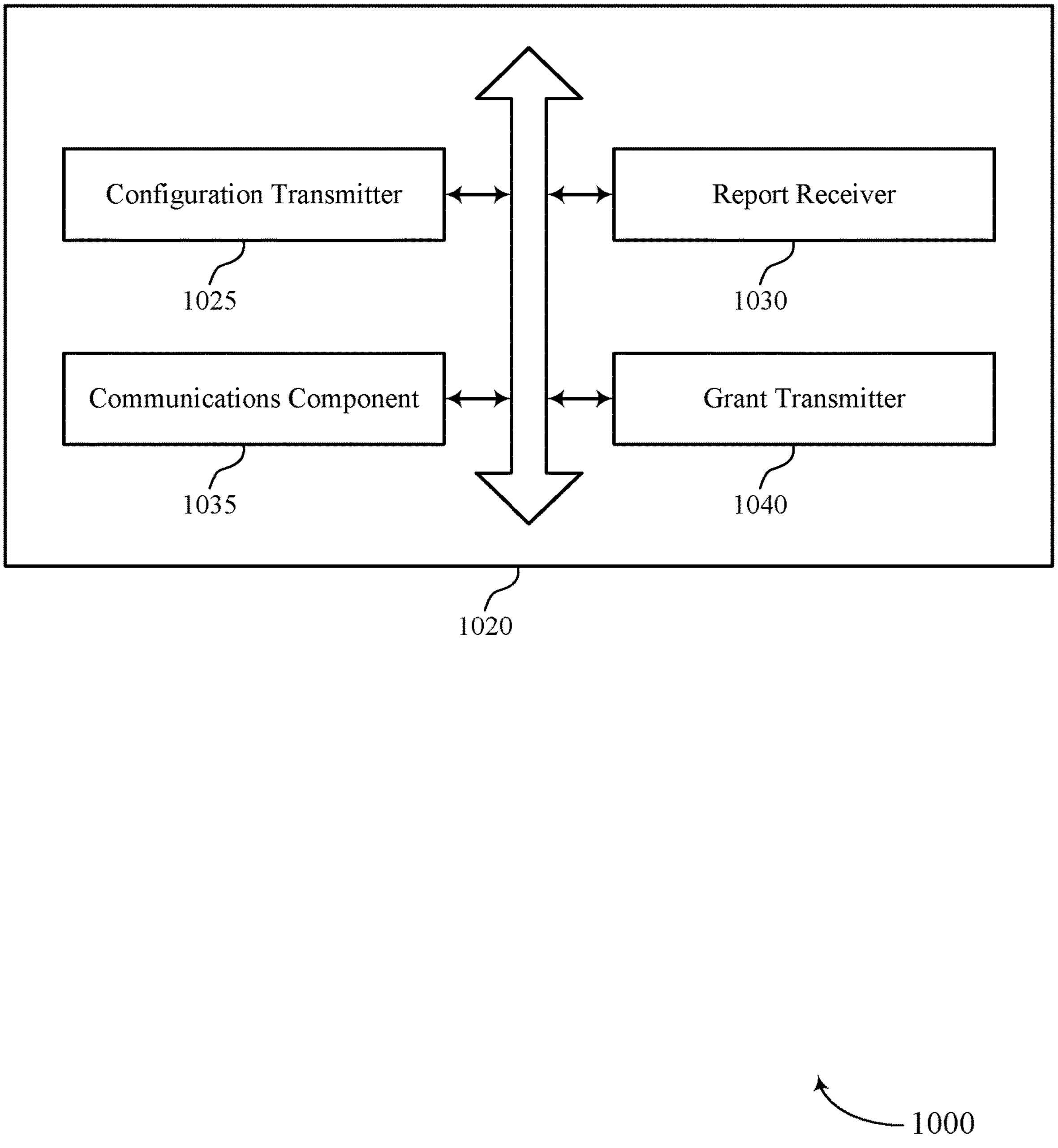
FIG. 10 shows a block diagram of a communications manager that supports techniques for non-serving cell reporting in wireless communications systems in accordance with aspects of the present disclosure.

FIG. 10 shows a block diagram 1000 of a communications manager 1020 that supports techniques for non-serving cell reporting in wireless communications systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for non-serving cell reporting in wireless communications systems as described herein. For example, the communications manager 1020 may include a configuration transmitter 1025, a report receiver 1030, a communications component 1035, a grant transmitter 1040, or any combination thereof. Each of these components may communicate, directly or indirectly, with one another (e.g., via one or more buses).

The communications manager 1020 may support wireless communication at a serving base station of a serving cell in accordance with examples as disclosed herein. The configuration transmitter 1025 may be configured as or otherwise support a means for transmitting, control signaling indicating an L1 configuration associated with inter-cell mobility from the serving cell to a non-serving cell for the UE, the L1 configuration for measuring a set of downlink reference signals from the non-serving cell and L1 reporting measurements of the set of downlink reference signals to the serving cell. The report receiver 1030 may be configured as or otherwise support a means for receiving, from the UE, an L1 report including channel information associated with a base station of the non-serving cell, the channel information indicating a set of channel metrics. The communications component 1035 may be configured as or otherwise support a means for performing the wireless communication with the UE based on the L1 report including the channel information associated with the base station of the non-serving cell. In some examples, the configuration transmitter 1025 may be configured as or otherwise support a means for transmitting second control signaling indicating a respective channel metric threshold for each channel metric of the set of channel metrics. In some examples, the L1 configuration includes an RRC configuration. In some examples, to support receiving the L1 report, the report receiver 1030 may be configured as or otherwise support a means for receiving, in a scheduling request, the L1 report including the channel information associated with the base station of the non-serving cell.

The grant transmitter 1040 may be configured as or otherwise support a means for transmitting an uplink grant scheduling one or more uplink resources based on a scheduling request from the UE. In some examples, to receive the L1 report, the report receiver 1030 may be configured as or otherwise support a means for receiving the L1 report including the channel information associated with the base station of the non-serving cell using the one or more uplink resources. In some examples, the one or more uplink resources include PUCCH resources or PUSCH resources, or a combination thereof. In some examples, to support receiving the L1 report, the report receiver 1030 may be configured as or otherwise support a means for receiving, in a MAC-CE message, the L1 report including the channel information associated with the base station of the non-serving cell. In some examples, the set of channel metrics includes an L1 RSRP value, an L1 SINR value, an L3 RSRP value, an L3 SINR value, a CQI value, a PMI value, an RI value, or an L1 value, or a combination thereof.

Figure 11:
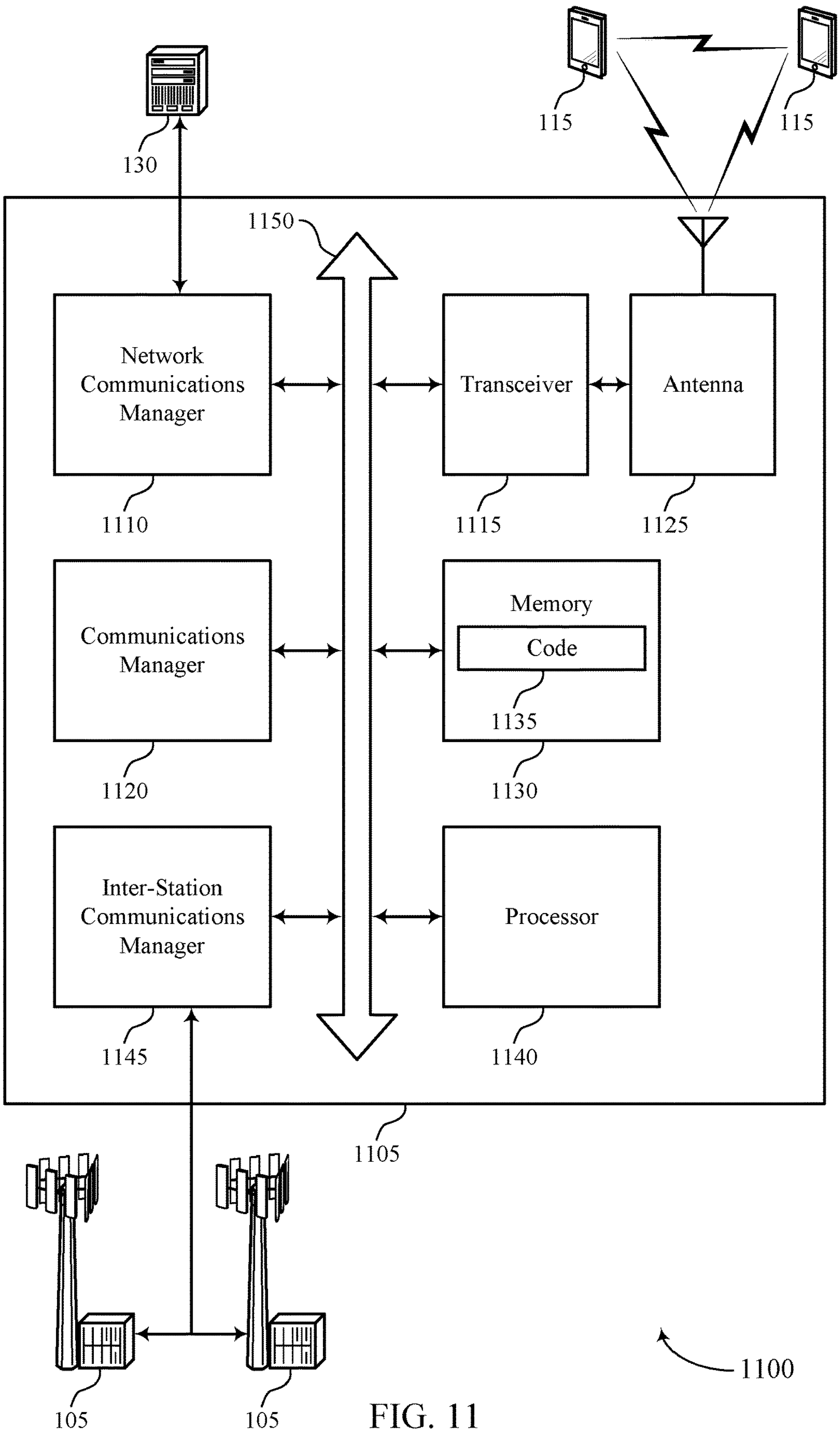
FIG. 11 shows a diagram of a system including a device that supports techniques for non-serving cell reporting in wireless communications systems in accordance with aspects of the present disclosure.

FIG. 11 shows a diagram of a system 1100 including a device 1105 that supports techniques for non-serving cell reporting in wireless communications systems in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for non-serving cell reporting in wireless communications systems). For example, the device 1105 or a component of the device 1105 may include a processor 1140 and memory 1130 coupled with the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a serving base station (e.g., the device 1105) of a serving cell in accordance with examples as disclosed herein. For example, the communications manager 1120 may be configured as or otherwise support a means for transmitting, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell. The communications manager 1120 may be configured as or otherwise support a means for receiving, from the UE, an L1 report including channel information associated with a base station of the non-serving cell, the channel information indicating a set of channel metrics. The communications manager 1120 may be configured as or otherwise support a means for performing the wireless communication with the UE based on the L1 report including the channel information associated with the base station of the non-serving cell. By including or configuring the communications manager 1120 in accordance with examples as described herein, the device 1105 may support techniques for receiving L1 reports associated with non-serving cells. Based on techniques for receiving L1 reports, the device 1105 may exhibit, for example, improved communication reliability, reduced latency, reduced power consumption, more efficient utilization of communication resources, improved coordination between devices, longer battery life, or improved utilization of processing capability, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for non-serving cell reporting in wireless communications systems as described herein, or the processor 1140 and the memory 1130 may be otherwise configured to perform or support such operations.

Figure 12:
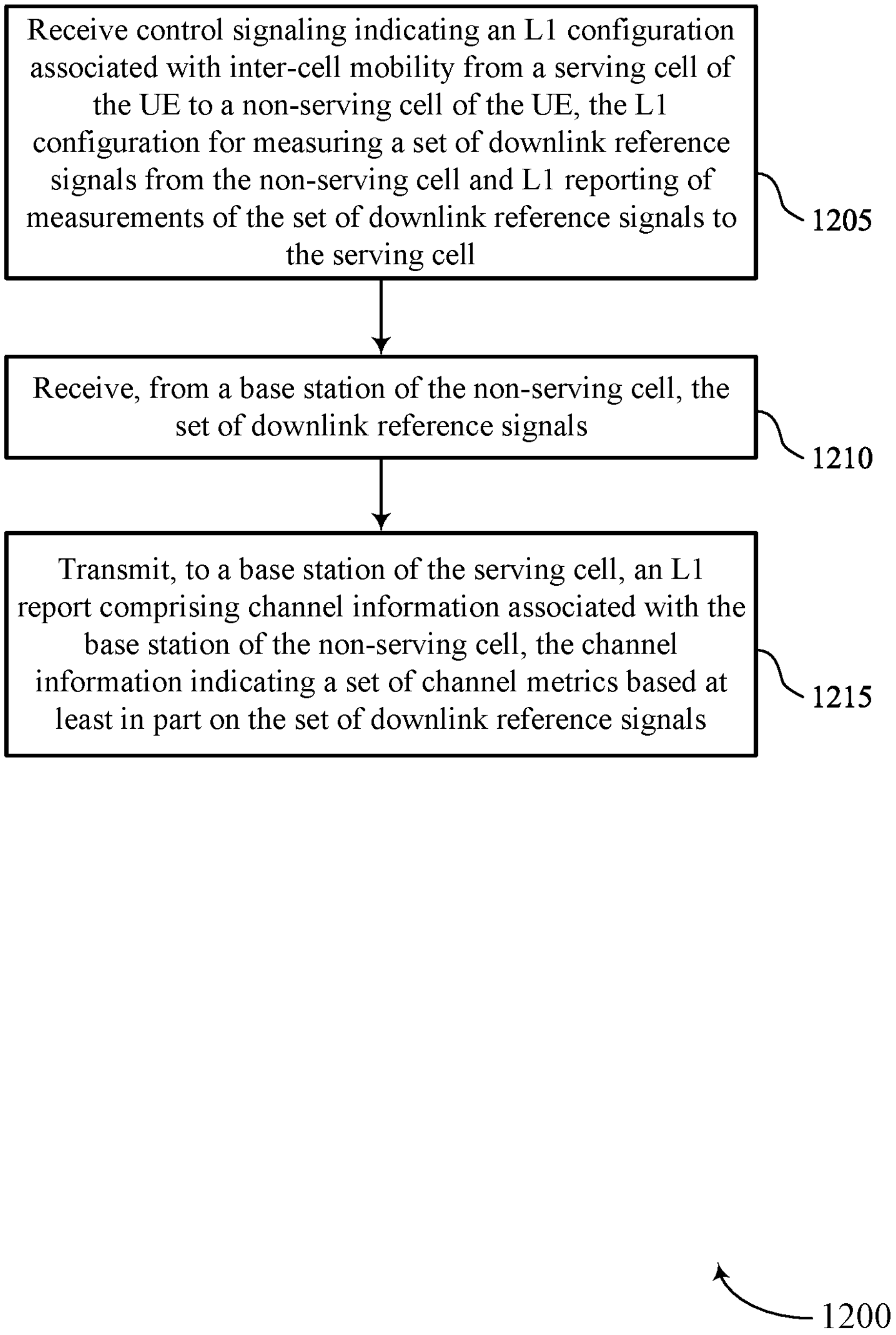
FIGS. 12 through 14 show flowcharts illustrating methods that support techniques for non-serving cell reporting in wireless communications systems in accordance with aspects of the present disclosure.

FIG. 12 shows a flowchart illustrating a method 1200 that supports techniques for non-serving cell reporting in wireless communications systems in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving control signaling indicating an L1 configuration associated with inter-cell mobility from a serving cell of the UE to a non-serving cell of the UE, the L1 configuration for measuring a set of downlink reference signals from the non-serving cell and L1 reporting of measurements of the set of downlink reference signals to the serving cell. The operations of 1205 may be performed in accordance with examples as disclosed herein. In some examples, aspects of the operations of 1205 may be performed by a configuration receiver 625 as described with reference to FIG. 6.

At 1210, the method may include receiving, from a base station of the non-serving cell, the set of downlink reference signals. The operations of 1210 may be performed in accordance with examples as disclosed herein. In some examples, aspects of the operations of 1210 may be performed by a reference signal receiver 630 as described with reference to FIG. 6.

At 1215, the method may include transmitting, to a base station of the serving cell, an L1 report including channel information associated with the base station of the non-serving cell, the channel information indicating a set of channel metrics based on the set of downlink reference signals. The operations of 1215 may be performed in accordance with examples as disclosed herein. In some examples, aspects of the operations of 1215 may be performed by a report transmitter 640 as described with reference to FIG. 6.

Figure 13:
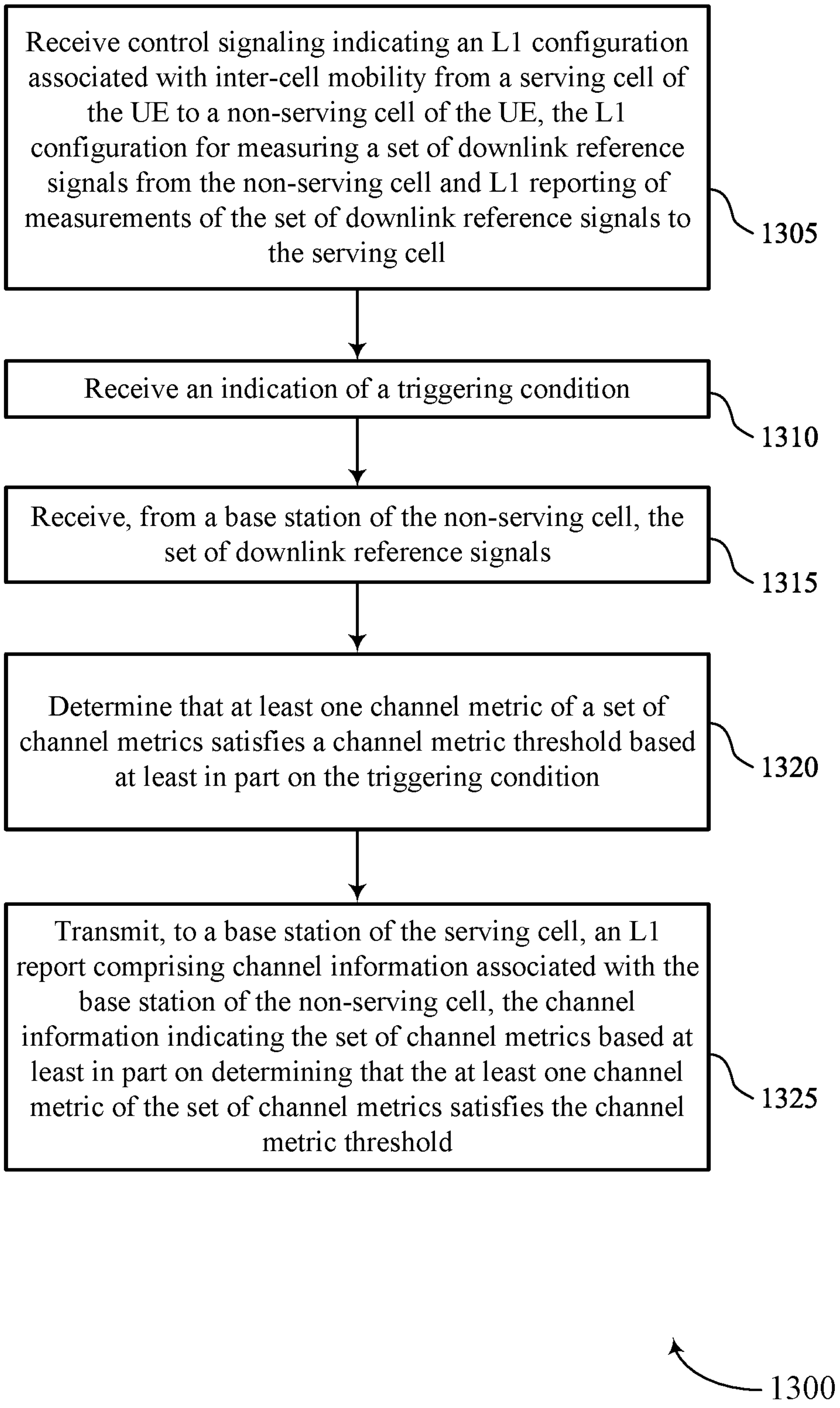

FIG. 13 shows a flowchart illustrating a method 1300 that supports techniques for non-serving cell reporting in wireless communications systems in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating an L1 configuration associated with inter-cell mobility from a serving cell of the UE to a non-serving cell of the UE, the L1 configuration for measuring a set of downlink reference signals from the non-serving cell and L1 reporting of measurements of the set of downlink reference signals to the serving cell. The operations of 1305 may be performed in accordance with examples as disclosed herein. In some examples, aspects of the operations of 1305 may be performed by a configuration receiver 625 as described with reference to FIG. 6.

At 1310, the method may include receiving an indication of a triggering condition. The operations of 1310 may be performed in accordance with examples as disclosed herein. In some examples, aspects of the operations of 1310 may be performed by a trigger receiver 645 as described with reference to FIG. 6.

At 1315, the method may include receiving, from a base station of the non-serving cell, the set of downlink reference signals. The operations of 1315 may be performed in accordance with examples as disclosed herein. In some examples, aspects of the operations of 1315 may be performed by a reference signal receiver 630 as described with reference to FIG. 6.

At 1320, the method may include determining that at least one channel metric of a set of channel metrics satisfies a channel metric threshold based on the triggering condition. The operations of 1320 may be performed in accordance with examples as disclosed herein. In some examples, aspects of the operations of 1320 may be performed by a threshold manager 650 as described with reference to FIG. 6.

At 1325, the method may include transmitting, to a base station of the serving cell, an L1 report including the channel information associated with the base station of the non-serving cell, the channel information indicating the set of channel metrics based on determining that the at least one channel metric of the set of channel metrics satisfies the channel metric threshold. The operations of 1325 may be performed in accordance with examples as disclosed herein. In some examples, aspects of the operations of 1325 may be performed by a report transmitter 640 as described with reference to FIG. 6.

Figure 14:
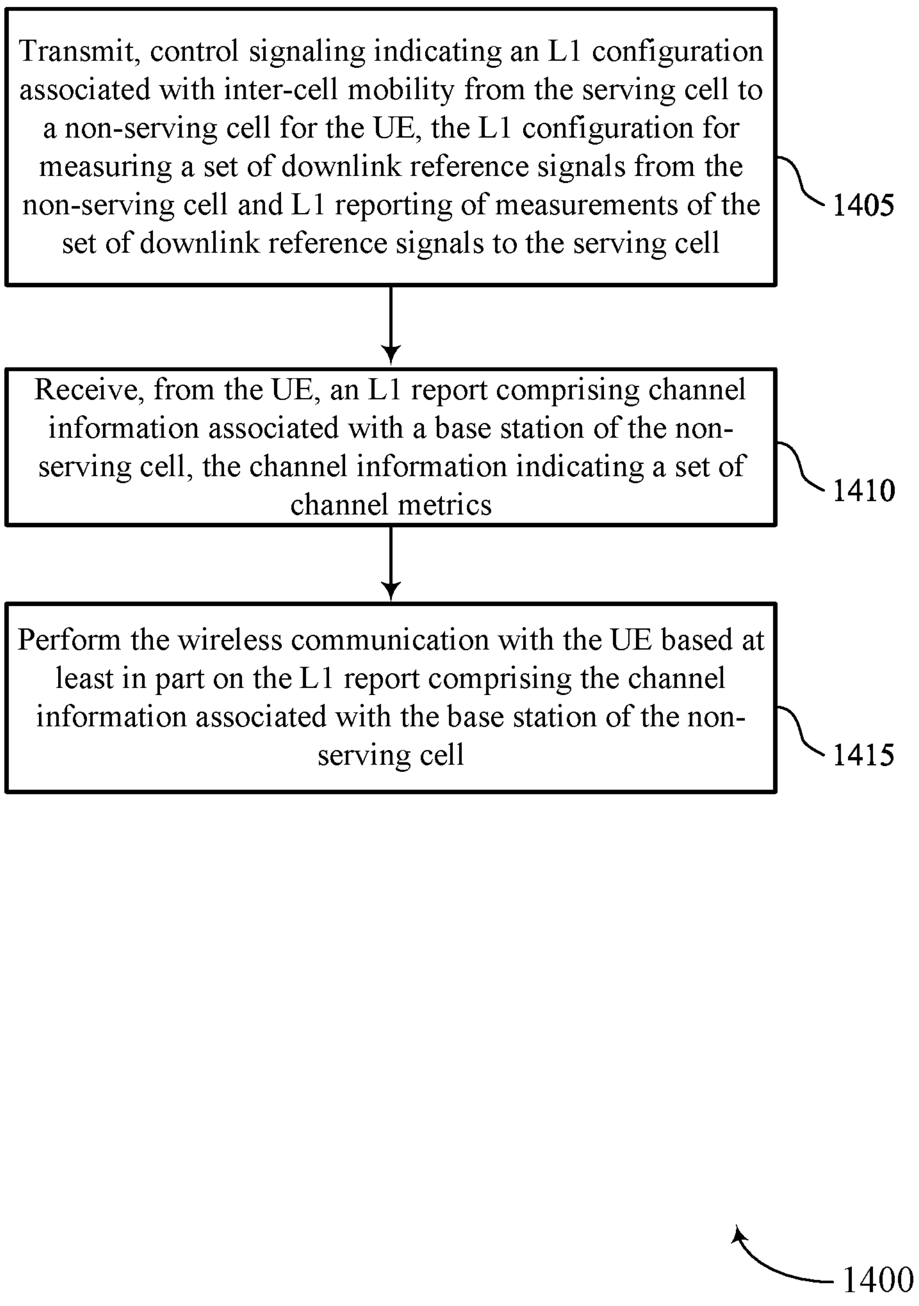

FIG. 14 shows a flowchart illustrating a method 1400 that supports techniques for non-serving cell reporting in wireless communications systems in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell. The operations of 1405 may be performed in accordance with examples as disclosed herein. In some examples, aspects of the operations of 1405 may be performed by a configuration transmitter 1025 as described with reference to FIG. 10.

At 1410, the method may include receiving, from the UE, an L1 report including channel information associated with a base station of the non-serving cell, the channel information indicating a set of channel metrics. The operations of 1410 may be performed in accordance with examples as disclosed herein. In some examples, aspects of the operations of 1410 may be performed by a report receiver 1030 as described with reference to FIG. 10.

At 1415, the method may include performing the wireless communication with the UE based on the L1 report including the channel information associated with the base station of the non-serving cell. The operations of 1415 may be performed in accordance with examples as disclosed herein. In some examples, aspects of the operations of 1415 may be performed by a communications component 1035 as described with reference to FIG. 10.

The following provides an overview of aspects of the present disclosure:

Aspect 1: A method for wireless communication at a UE, comprising: receiving control signaling indicating an L1 configuration associated with inter-cell mobility from a serving cell of the UE to a non-serving cell for the UE, the L1 configuration for measuring a set of downlink reference signals from the non-serving cell and L1 reporting of measurements of the set of downlink reference signals to a serving cell; receiving, from a base station of the non-serving cell, the set of downlink reference signals; and transmitting, to a base station of the serving cell, an L1 report comprising channel information, the channel information associated with the base station of the non-serving cell, the channel information indicating a set of channel metrics based at least in part on the set of downlink reference signals.

Aspect 2: The method of aspect 1, wherein the set of downlink reference signals comprises a set of SSBs.

Aspect 3: The method of any of aspects 1 through 2, wherein the set of channel metrics comprises an L1 RSRP value, an L1 SINR value, an L3 RSRP value, an L3 SINR value, a CQI value, a PMI value, a rank indicator value, or an L1 value, or a combination thereof.

Aspect 4: The method of any of aspects 1 through 3, further comprising: receiving an indication of a triggering condition; and determining that at least one channel metric of the set of channel metrics satisfies a channel metric threshold based at least in part on the triggering condition, wherein transmitting the L1 report comprising the channel information associated with the base station of the non-serving cell is based at least in part on determining that the at least one channel metric of the set of channel metrics satisfies the channel metric threshold.

Aspect 5: The method of aspect 4, further comprising: determining a respective channel metric threshold for each channel metric of the set of channel metrics based at least in part on the L1 configuration, wherein determining that the at least one channel metric of the set of channel metrics satisfies the channel metric threshold is based at least in part on the L1 configuration.

Aspect 6: The method of any of aspects 1 through 5, wherein the L1 configuration comprises an RRC configuration.

Aspect 7: The method of any of aspects 1 through 6, further comprising: determining the set of channel metrics for a single downlink reference signal of the set of downlink reference signals based at least in part on the L1 configuration, wherein the channel information comprises the set of channel metrics for the single downlink reference signal of the set of downlink reference signals.

Aspect 8: The method of any of aspects 1 through 7, further comprising: determining the set of channel metrics for each downlink reference signal of the set of downlink reference signals based at least in part on the L1 configuration, wherein the channel information comprises the set of channel metrics for each downlink reference signal of the set of downlink reference signals.

Aspect 9: The method of aspect 8, further comprising: selecting one or more downlink reference signals of the set of downlink reference signals based at least in part on the L1 configuration, each downlink reference signal of the one or more downlink reference signals having a highest channel metric for each channel metric of the set of channel metrics compared to other downlink reference signals of the set of downlink reference signals; and determining an average of each channel metric of the set of channel metrics associated with the one or more downlink reference signals, wherein the channel information comprises the average of each channel metric of the set of channel metrics associated with the one or more downlink reference signals.

Aspect 10: The method of any of aspects 8 through 9, further comprising: determining that each channel metric of the set of channel metrics associated with one or more downlink reference signals of the set of downlink reference signals satisfies a channel metric threshold; and determining an average of each channel metric of the set of channel metrics associated with each downlink reference signal of the one or more downlink reference signals, wherein the channel information comprises the average of each channel metric of the set of channel metrics associated with each downlink reference signal of the one or more downlink reference signals.

Aspect 11: The method of aspect 1, further comprising: determining that each channel metric of the set of channel metrics associated with each downlink reference signal of the set of downlink reference signals does not satisfy a channel metric threshold; selecting a downlink reference signal of the set of downlink reference signals based at least in part on the L1 configuration, wherein the downlink reference signal is associated with a highest channel metric for each channel metric of the set of channel metrics compared to other downlink reference signals of the set of downlink reference signals, wherein the channel information comprises the set of channel metrics for the selected downlink reference signal of the set of downlink reference signals.

Aspect 12: The method of any of aspects 1 through 11, wherein transmitting the L1 report comprises: transmitting, in a scheduling request, the L1 report comprising the channel information associated with the base station of the non-serving cell.

Aspect 13: The method of any of aspects 1 through 12, further comprising: receiving, from the base station of the serving cell associated with the UE, an uplink grant scheduling one or more uplink resources based at least in part on a scheduling request from the UE, wherein transmitting the L1 report comprises: transmitting the L1 report comprising the channel information associated with the base station of the non-serving cell using the one or more uplink resources.

Aspect 14: The method of aspect 13, wherein the one or more uplink resources comprise PUCCH resources or PUSCH resources, or a combination thereof.

Aspect 15: The method of any of aspects 1 through 14, wherein transmitting the L1 report comprises: transmitting, in a MAC-CE message, the L1 report comprising the channel information associated with the base station of the non-serving cell based at least in part on an uplink grant.

Aspect 16: The method of any of aspects 1 through 15, wherein the set of downlink reference signals comprises a set of CSI-RSs.

Aspect 17: A method for wireless communication at a serving base station of a serving cell, comprising: transmitting, control signaling indicating an L1 configuration associated with inter-cell mobility from the serving cell to a non-serving cell for the UE, the L1 configuration for measuring a set of downlink reference signals from the non-serving cell and L1 reporting of measurements of the set of downlink reference signals to the serving cell of the UE; receiving, from the UE, an L1 report comprising channel information associated with a base station of the non-serving cell, the channel information indicating a set of channel metrics; and performing the wireless communication with the UE based at least in part on the L1 report comprising the channel information associated with the base station of the non-serving cell.

Aspect 18: The method of aspect 17, wherein the set of channel metrics comprises an L1 RSRP value, an L1 SINR value, an L3 RSRP value, an L3 SINR value, a CQI value, a PMI value, an RI value, or an L1 value, or a combination thereof.

Aspect 19: The method of aspect 17, further comprising: transmitting the L1 configuration comprising a respective channel metric threshold for each channel metric of the set of channel metrics.

Aspect 20: The method of aspect 17, wherein the configuration comprises an RRC configuration.

Aspect 21: The method of any of aspects 17 through 20, wherein receiving the L1 report comprises: receiving, in a scheduling request, the L1 report comprising the channel information associated with the base station of the non-serving cell.

Aspect 22: The method of any of aspects 17 through 21, further comprising: transmitting an uplink grant scheduling one or more uplink resources based at least in part on a scheduling request from the UE, wherein receiving the L1 report comprises: receiving the L1 report comprising the channel information associated with the base station of the non-serving cell using the one or more uplink resources.

Aspect 23: The method of aspect 22, wherein the one or more uplink resources comprise PUCCH resources or PUSCH resources, or a combination thereof.

Aspect 24: The method of any of aspects 17 through 23, wherein receiving the L1 report comprises: receiving, in a MAC-CE message, the L1 report comprising the channel information associated with the base station of the non-serving cell.

Aspect 25: An apparatus for wireless communication at a UE, comprising a processor; memory coupled with the processor; and instructions stored in the memory and executable by the processor to cause the apparatus to perform a method of any of aspects 1 through 16.

Aspect 26: An apparatus for wireless communication at a UE, comprising at least one means for performing a method of any of aspects 1 through 16.

Aspect 27: A non-transitory computer-readable medium storing code for wireless communication at a UE, the code comprising instructions executable by a processor to perform a method of any of aspects 1 through 16.

Aspect 28: An apparatus for wireless communication at a serving base station of a serving cell, comprising a processor; memory coupled with the processor; and instructions stored in the memory and executable by the processor to cause the apparatus to perform a method of any of aspects 17 through 24.

Aspect 29: An apparatus for wireless communication at a serving base station of a serving cell, comprising at least one means for performing a method of any of aspects 17 through 24.

Aspect 30: A non-transitory computer-readable medium storing code for wireless communication at a serving base station of a serving cell, the code comprising instructions executable by a processor to perform a method of any of aspects 17 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving control signaling indicating a configuration associated with inter-cell mobility from a serving cell of the UE to a non-serving cell for the UE, the configuration indicating for the UE to measure a set of downlink reference signals from the non-serving cell and perform layer one reporting of measurements of the set of downlink reference signals to the serving cell, the configuration indicating a respective channel metric threshold associated with each channel metric of a plurality of channel metrics, wherein the plurality of channel metrics comprise a layer one reference signal received power, a layer three reference signal received power, a channel quality indicator, a precoding matrix indicator, a rank indicator value, and a layer indicator;

receiving, from a network entity of the non-serving cell, the set of downlink reference signals to generate a plurality of channel measurements associated with each channel metric of the plurality of channel metrics;

determining, based at least in part on at least one channel measurement of the plurality of channel measurements satisfying the respective channel metric threshold for a respective channel metric, an average of a subset of channel measurements of the plurality of channel measurements, wherein each channel measurement of the subset of channel measurements satisfies the respective channel metric threshold for the respective channel metric; and transmitting, via a medium access control-control element (MAC-CE) message on one or more previously configured resources, a single layer one report comprising channel information associated with the network entity of the non-serving cell, the channel information indicating the average of the subset of channel measurements associated with each channel metric, wherein the one or more previously configured resources are not associated with an uplink grant.

2. The method of claim 1, wherein the set of downlink reference signals comprises a set of synchronization signal blocks.

3. The method of claim 1, wherein the plurality of channel metrics further comprise a layer one signal-to-interference-plus-noise-ratio value, and a layer three signal-to-interference-plus-noise-ratio value.

4. The method of claim 1, further comprising:

receiving an indication of a triggering condition, wherein determining the average of the subset of channel measurements is based at least in part on the triggering condition.

5. The method of claim 1, wherein the configuration comprises a radio resource control configuration.

6. The method of claim 1, further comprising:

determining the subset of channel measurements for a single downlink reference signal of the set of downlink reference signals based at least in part on the configuration.

7. The method of claim 1, further comprising:

determining the subset of channel measurements for each downlink reference signal of the set of downlink reference signals based at least in part on the configuration.

8. The method of claim 7, further comprising:

selecting one or more downlink reference signals of the set of downlink reference signals based at least in part on the configuration, each downlink reference signal of the one or more downlink reference signals having a highest channel measurement associated with each channel metric of the plurality of channel metrics compared to other downlink reference signals of the set of downlink reference signals, wherein the subset of channel measurements are associated with the one or more downlink reference signals.

9. The method of claim 7, further comprising:

determining that each channel measurement of the subset of channel measurements associated with one or more downlink reference signals of the set of downlink reference signals satisfies the respective channel metric threshold for the respective channel metric, wherein the subset of channel measurements are associated with the one or more downlink reference signals.

10. The method of claim 1, wherein the set of downlink reference signals comprises a set of channel state information reference signals.

11. A method for wireless communication at a serving network entity of a serving cell, comprising:

transmitting control signaling indicating a configuration associated with inter-cell mobility from the serving cell to a non-serving cell for a user equipment (UE), the configuration indicating for the UE to measure a set of downlink reference signals from the non-serving cell and perform layer one reporting of measurements of the set of downlink reference signals to the serving cell, the configuration indicating a respective channel metric threshold associated with each channel metric of a plurality of channel metrics, wherein the plurality of channel metrics comprise a layer one reference signal received power, a layer three reference signal received power, a channel quality indicator, a precoding matrix indicator, a rank indicator value, and a layer indicator;

receiving, from the UE and based at least in part on at least one channel measurement of a plurality of channel measurements associated with each channel metric of the plurality of channel metrics satisfying the respective channel metric threshold for the respective channel metric, a single layer one report comprising channel information associated with a network entity of the non-serving cell, the channel information indicating an average of a subset of channel measurements of the plurality of channel measurements, wherein each channel measurement of the subset of channel measurements satisfies the respective channel metric threshold for the respective channel metric, and wherein the subset of channel measurements are based at least in part on the set of downlink reference signals, wherein the single layer one report is received via a medium access control-control element (MAC-CE) message on one or more previously configured resources, and wherein the one or more previously configured resources are not associated with an uplink grant; and performing the wireless communication with the UE based at least in part on the single layer one report comprising the channel information associated with the network entity of the non-serving cell.

12. The method of claim 11, wherein the plurality of channel metrics further comprise a layer one signal-to-interference-plus-noise-ratio value, and a layer three signal-to-interference-plus-noise-ratio value.

13. The method of claim 11, wherein the configuration comprises a radio resource control configuration.

14. The method of claim 11, wherein the one or more previously configured resources comprise physical uplink control channel resources or physical uplink shared channel resources, or a combination thereof.

15. An apparatus for wireless communication at a user equipment (UE), comprising:

one or more processors;

one or more memories coupled with the one or more processors; and instructions stored in the one or more memories and executable by the one or more processors to cause the apparatus to:

receive control signaling indicating a configuration associated with inter-cell mobility from a serving cell of the UE to a non-serving cell for the UE, the configuration indicating for the UE to measure a set of downlink reference signals from the non-serving cell and perform layer one reporting of measurements of the set of downlink reference signals to the serving cell of the UE, the configuration indicating a respective channel metric threshold associated with each channel metric of a plurality of channel metrics, wherein the plurality of channel metrics comprise a layer one reference signal received power, a layer three reference signal received power, a channel quality indicator, a precoding matrix indicator, a rank indicator value, and a layer indicator;

receive, from a network entity of the non-serving cell, the set of downlink reference signals to generate a plurality of channel measurements associated with each channel metric of the plurality of channel metrics;

determine, based at least in part on at least one channel measurement of the plurality of channel measurements satisfying the respective channel metric threshold for a respective channel metric, an average of a subset of channel measurements of the plurality of channel measurements, wherein each channel measurement of the subset of channel measurements satisfies the respective channel metric threshold for the respective channel metric; and transmit, via a medium access control-control element (MAC-CE) message on one or more previously configured resources, a single layer one report comprising channel information associated with the network entity of the non-serving cell, the channel information indicating the average of the subset of channel measurements associated with each channel metric, wherein the one or more previously configured resources are not associated with an uplink grant.

16. The apparatus of claim 15, wherein the set of downlink reference signals comprises a set of synchronization signal blocks.

17. The apparatus of claim 15, wherein the plurality of channel metrics further comprise a layer one signal-to-interference-plus-noise-ratio value, and a layer three signal-to-interference-plus-noise-ratio value.

18. An apparatus for wireless communication at a serving network entity of a serving cell, comprising:

one or more processors;

one or more memories coupled with the one or more processors; and instructions stored in the one or more memories and executable by the one or more processors to cause the apparatus to:

transmit control signaling indicating a configuration associated with inter-cell mobility from the serving cell to a non-serving cell for a user equipment (UE), the configuration indicating for the UE to measure a set of downlink reference signals from the non-serving cell and perform layer one reporting of measurements of the set of downlink reference signals to the serving cell, the configuration indicating a respective channel metric threshold associated with each channel metric of a plurality of channel metrics, wherein the plurality of channel metrics comprise a layer one reference signal received power, a layer three reference signal received power, a channel quality indicator, a precoding matrix indicator, a rank indicator value, and a layer indicator;

receive, from the UE and based at least in part on at least one channel measurement of a plurality of channel measurements associated with each channel metric of the plurality of channel metrics satisfying the respective channel metric threshold for the respective channel metric, a single layer one report comprising channel information associated with a network entity of the non-serving cell, the channel information indicating an average of a subset of channel measurements of the plurality of channel measurements, wherein each channel measurement of the subset of channel measurements satisfies the respective channel metric threshold for the respective channel metric, and wherein the subset of channel measurements are based at least in part on the set of downlink reference signals, wherein the single layer one report is received via a medium access control-control element (MAC-CE) message on one or more previously configured resources, and wherein the one or more previously configured resources are not associated with an uplink grant; and perform the wireless communication with the UE based at least in part on the single layer one report comprising the channel information associated with the network entity of the non-serving cell.

19. The apparatus of claim 18, wherein the plurality of channel metrics further comprise a layer one signal-to-interference-plus-noise-ratio value, and a layer three signal-to-interference-plus-noise-ratio value.

* * * * *